(12) United States Patent
Houjou

(10) Patent No.: US 9,098,534 B2
(45) Date of Patent: Aug. 4, 2015

(54) IMAGE DISPLAY SYSTEM, IMAGE DISPLAY METHOD, SOCIAL NETWORK SERVICE SYSTEM, AND COMPUTER-READABLE MEDIUM

(75) Inventor: Yoshiharu Houjou, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 75 days.

(21) Appl. No.: 13/555,464

(22) Filed: Jul. 23, 2012

(65) Prior Publication Data
US 2013/0027435 A1   Jan. 31, 2013

(30) Foreign Application Priority Data

Jul. 25, 2011   (JP) .................................. 2011-161842

(51) Int. Cl.
| | |
|---|---|
| G09G 5/00 | (2006.01) |
| G06F 17/30 | (2006.01) |
| G06T 3/40 | (2006.01) |
| H04L 29/08 | (2006.01) |
| H04N 1/00 | (2006.01) |

(52) U.S. Cl.
CPC .............. *G06F 17/3028* (2013.01); *G06T 3/40* (2013.01); *H04L 67/06* (2013.01); *H04N 1/00177* (2013.01); *H04N 1/00198* (2013.01); *H04N 1/00244* (2013.01); *G09G 2340/0414* (2013.01); *H04N 2201/001* (2013.01); *H04N 2201/0089* (2013.01)

(58) Field of Classification Search
CPC .............. G09G 2340/0407; G09G 2340/0414; G06T 3/40
See application file for complete search history.

(56) References Cited

U.S. PATENT DOCUMENTS

| | | | |
|---|---|---|---|
| 4,695,966 | A | 9/1987 | Takakura et al. |
| 4,949,279 | A | 8/1990 | Takakura et al. |
| 5,621,868 | A | 4/1997 | Mizutani et al. |
| 6,973,628 | B2 | 12/2005 | Asami |
| 7,339,622 | B2 | 3/2008 | Yokokawa |

(Continued)

FOREIGN PATENT DOCUMENTS

| | | |
|---|---|---|
| JP | 60-198687 A | 10/1985 |
| JP | 1-46905 B2 | 10/1989 |

(Continued)

OTHER PUBLICATIONS

Japanese Office Action dated May 14, 2013 (and English translation thereof) in counterpart Japanese Application No. 2011-161842.

(Continued)

*Primary Examiner* — James A Thompson
*Assistant Examiner* — Tapas Mazumder
(74) *Attorney, Agent, or Firm* — Holtz, Holtz, Goodman & Chick PC

(57) ABSTRACT

An image display system includes a transmission unit configured to cause a terminal to transmit images to a server through a network, a storage configured to store the images transmitted by the transmission unit, a layout unit configured to write resized images of the images stored in the storage into a display buffer, and a display control unit configured to display resized images on the terminal, which are in a display region of the display buffer, wherein the display control unit is configured to change a position of the display region such that a first resized image is more frequently displayed than a second resized image.

8 Claims, 21 Drawing Sheets

(56) References Cited

U.S. PATENT DOCUMENTS

| | | |
|---|---|---|
| 8,291,317 B2 | 10/2012 | Yamamoto |
| 2004/0068505 A1* | 4/2004 | Lee et al. .................. 707/100 |
| 2006/0150108 A1* | 7/2006 | Adachi et al. .............. 715/750 |
| 2008/0211831 A1* | 9/2008 | Honda et al. ............... 345/619 |
| 2009/0106699 A1 | 4/2009 | Kihara et al. |
| 2010/0229126 A1* | 9/2010 | Mihara et al. .............. 715/841 |
| 2010/0275140 A1 | 10/2010 | Ishii et al. |
| 2012/0130834 A1* | 5/2012 | Landry ..................... 705/26.1 |
| 2013/0013988 A1 | 1/2013 | Yamamoto |

FOREIGN PATENT DOCUMENTS

| | | |
|---|---|---|
| JP | 05-204374 A | 8/1993 |
| JP | 8-44867 A | 2/1996 |
| JP | 2002-74322 A | 3/2002 |
| JP | 2004-213598 A | 7/2004 |
| JP | 2004-274581 A | 9/2004 |
| JP | 2005-303817 A | 10/2005 |
| JP | 2008-146602 A | 6/2008 |
| JP | 2008-242639 A | 10/2008 |
| JP | 2009-105594 A | 5/2009 |
| JP | 2010-086194 A | 4/2010 |
| JP | 2010-258665 A | 11/2010 |

OTHER PUBLICATIONS

Yaushiro Inoshima et al, "Water-Color-Like Painting from real picture", vol. 32, No. 58, ITE Technical Report, Japan, The Institute of Image Information and Television Engineers, Dec. 18, 2008, pp. 49-52.

* cited by examiner

IMAGE DISPLAY SYSTEM, IMAGE DISPLAY METHOD, SOCIAL NETWORK SERVICE SYSTEM, AND COMPUTER-READABLE MEDIUM

CROSS-REFERENCE TO RELATED APPLICATIONS

This application is based upon and claims the benefit of priority from prior Japanese Patent Application No. 2011-161842, filed Jul. 25, 2011, the entire contents of which are incorporated herein by reference.

BACKGROUND OF THE INVENTION

1. Field of the Invention

The present invention relates to an image display system, for example, to display of images stored in a server through a network in an image posting site of a social network service (SNS).

2. Description of the Related Art

Nowadays how to enjoy a photograph is diversified with the spread of a digital camera. Various items of image processing can be performed because of digital image data.

For example, Jpn. Pat. Appln. KOKAI Publication No. 8-44867 (corresponding to U.S. Pat. No. 5,621,868) proposes a technology of generating and displaying an image (snapshot-to-painting conversion), which has a tone (for example, a painting-tone image) with an atmosphere different from an original photograph although based on the original photograph, by performing the image processing.

For example, in a technology disclosed in Jpn. Pat. Appln. KOKAI Publication No. 2004-213598, the technology of Jpn. Pat. Appln. KOKAI Publication No. 8-44867 is developed, features, such as color information and information on a feeling of a brush, are extracted from an image of a painting actually painted by a painter, and the photographed image is converted into a high-artistic-quality, painting-tone image in consideration of the whole original image by providing the extracted features to the photographed image.

There is also proposed a technology of bringing about a change by modifying image quality, such as the painting tone (for example, see Jpn. Pat. Appln. KOKOKU Publication No. 1-46905 (corresponding to Jpn. Pat. Appln. KOKAI Publication No. 60-198687, and U.S. Pat. Nos. 4,695,966 and 4,949,279)).

Because a powerful image processing engine is required to perform the snapshot-to-painting conversion, it is conceivable that the image processing engine is provided in the server on the network, that a user uploads a photograph of the user on the server to perform the image processing, such as the snapshot-to-painting conversion, on the server.

In such cases, the user wants to exhibit the photograph when producing an artwork by performing the snapshot-to-painting conversion to the photograph of the user, and the user wants to exhibit the photograph. One of the methods for satisfying the demand is to post the photograph on the network by the SNS (for example, see Jpn. Pat. Appln. KOKAI Publication No. 2008-242639).

Hereinafter, the image in which the photograph of the user is uploaded on the server by the user and the image that is obtained through the image processing, such as the snapshot-to-painting conversion, on the server is referred to as "artwork."

There is well known a technology of selectively displaying an image of a display object in temporal order in displaying many (tens of thousands of) images (for example, see Jpn. Pat. Appln. KOKAI Publication No. 2002-074322 (corresponding to U.S. Pat. No. 6,973,628 B2).

However, in the related art, because there is a limitation to the number of artworks that can be displayed at once, unfortunately a browsing property of the artwork is degraded when many users post a large amount of artworks on a server. Even if the technology disclosed in Jpn. Pat. Apple. KOKAI Publication No. 2002-074322 is used, there is also generated a problem in that the browsing property of many artworks cannot be improved such that an interest of the user is awaken.

BRIEF SUMMARY OF THE INVENTION

An object of the invention is to provide an image display system, an image display method, and a computer-readable medium which can efficiently display the images stored in the server through the network in the SNS such that the interest of the user is awaken.

According to an embodiment, an image display system includes:

a transmission unit configured to cause a terminal to transmit images to a server through a network;

a storage configured to store the images transmitted by the transmission unit;

a layout unit configured to write resized images of the images stored in the storage into a display buffer; and a display control unit configured to display resized images on the terminal, which are in a display region of the display buffer, wherein the display control unit is configured to change a position of the display region such that a first resized image is more frequently displayed than a second resized image.

According to the invention, the images stored in the server through the network can efficiently be displayed such that the interest of the user is awakened.

DETAILED DESCRIPTION OF THE INVENTION

Various embodiments will be described hereinafter with reference to the accompanying drawings.

First Embodiment

Figure 1:
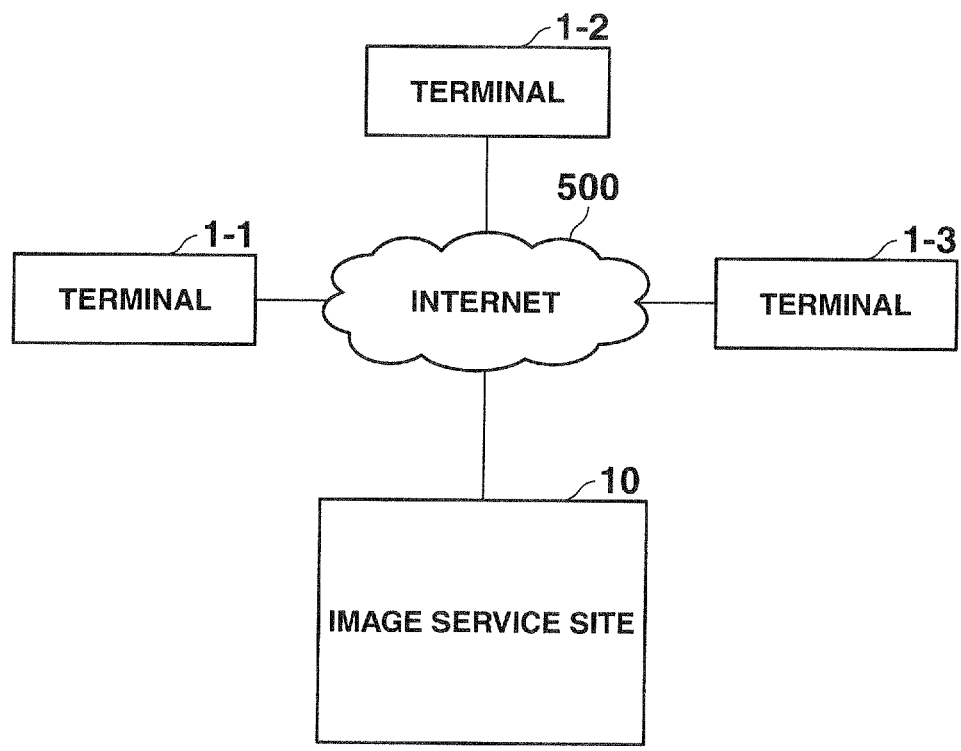
FIG. 1 is a block diagram illustrating a configuration of an image display system, which is common to each embodiment.

FIG. 1 is a block diagram showing the configuration of a network of an image display system common to all embodiments of the present invention. An image service site 10 with a social network service function is connected to a plurality of terminals 1-1, 1-2, 1-3, . . . via a network such as the Internet 500. The terminal may be an ordinary personal computer, tablet computer, or mobile phone.

The service site 10 stores image data (mainly image data of a photo shot by a digital camera) uploaded from a user via the terminals 1-1, 1-2, 1-3, . . . , converts the uploaded image into painting image, and also allows other users to browse the uploaded image and the converted painting image.

Figure 2:
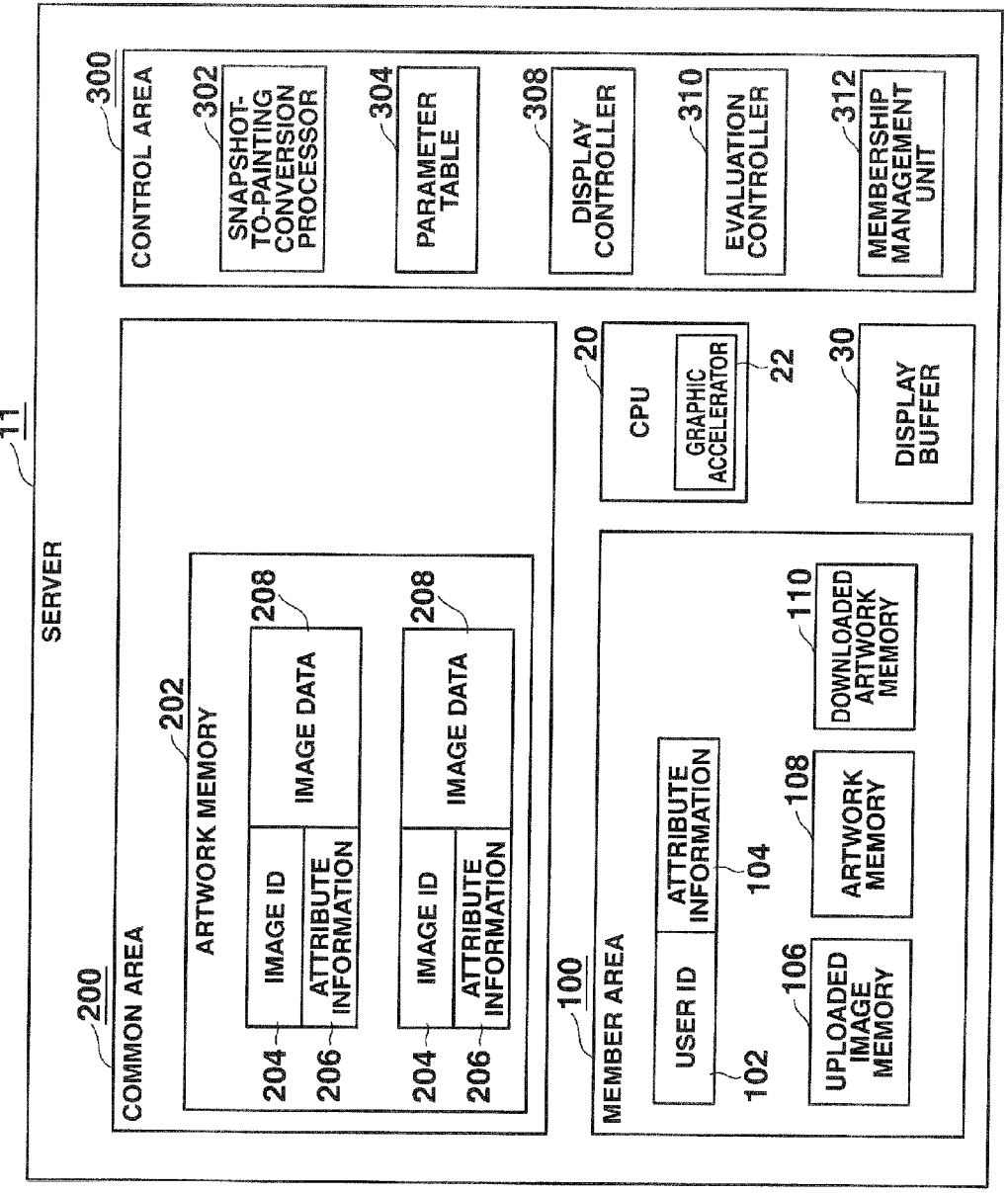
FIG. 2 is a block diagram illustrating a schematic configuration of a server that implements an image service site, which is common to each embodiment.

FIG. 2 is a block diagram showing principal portions in the configuration of a server 11 realizing the service site 10. The server 11 includes a member area 100, a common area 200, and a control area 300.

The member area 100 is an area provided for each registered member and stores a user ID 102 to identify each member and various kinds of attribute information 104 for each user corresponding thereto.

Figure 3:
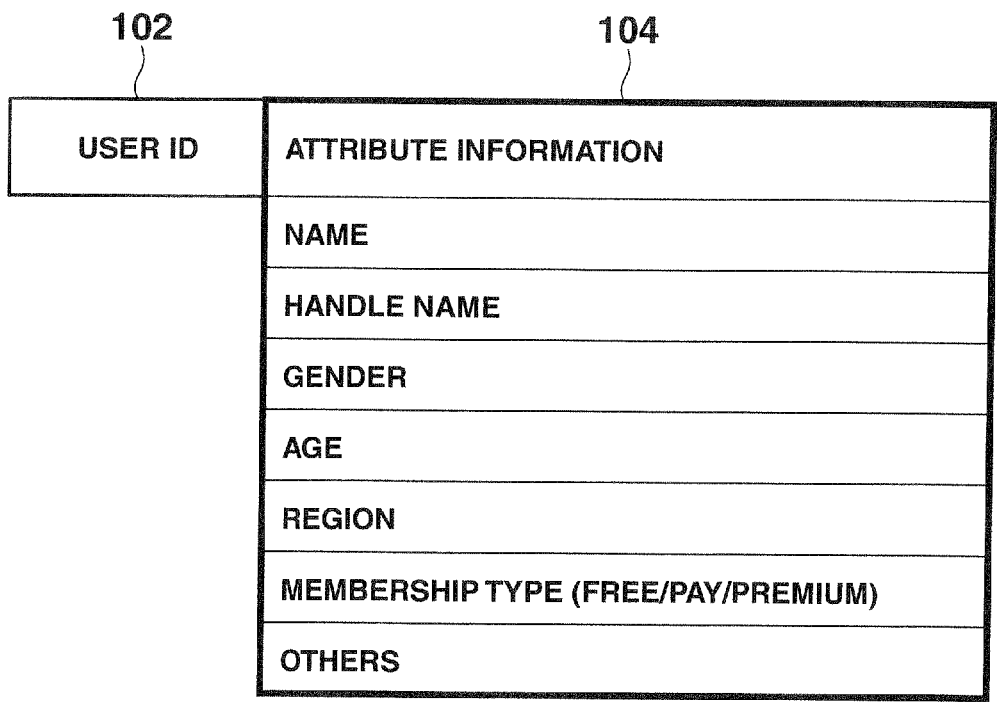
FIG. 3 is a view illustrating attribute information on a user ID.

The attribute information 104 is, as shown in FIG. 3, user-specific information including the name, handle name, gender, age, region, membership type, and others. The membership type includes a free member registered without charge, a pay member registered on a chargeable basis, and a premium member who pays a special membership fee (for example, an annual membership fee).

The member area 100 includes an uploaded image memory 106 which stores image data of photos uploaded by the user, an artwork memory 108 which stores painting images (artworks) obtained through snapshot-to-painting conversion by the server 11, and a downloaded artwork memory 110 which stores artworks of other users downloaded from the other users.

The common area 200 is an area provided commonly to all users and includes an artwork memory 202 which stores many artworks obtained by snapshot-to-painting conversion of images uploaded by the users.

Each artwork stored in the artwork memory 202 has image data 208 stored together with an image ID 204 to identify the artwork and attribute information 206 of the artwork.

Figure 4:
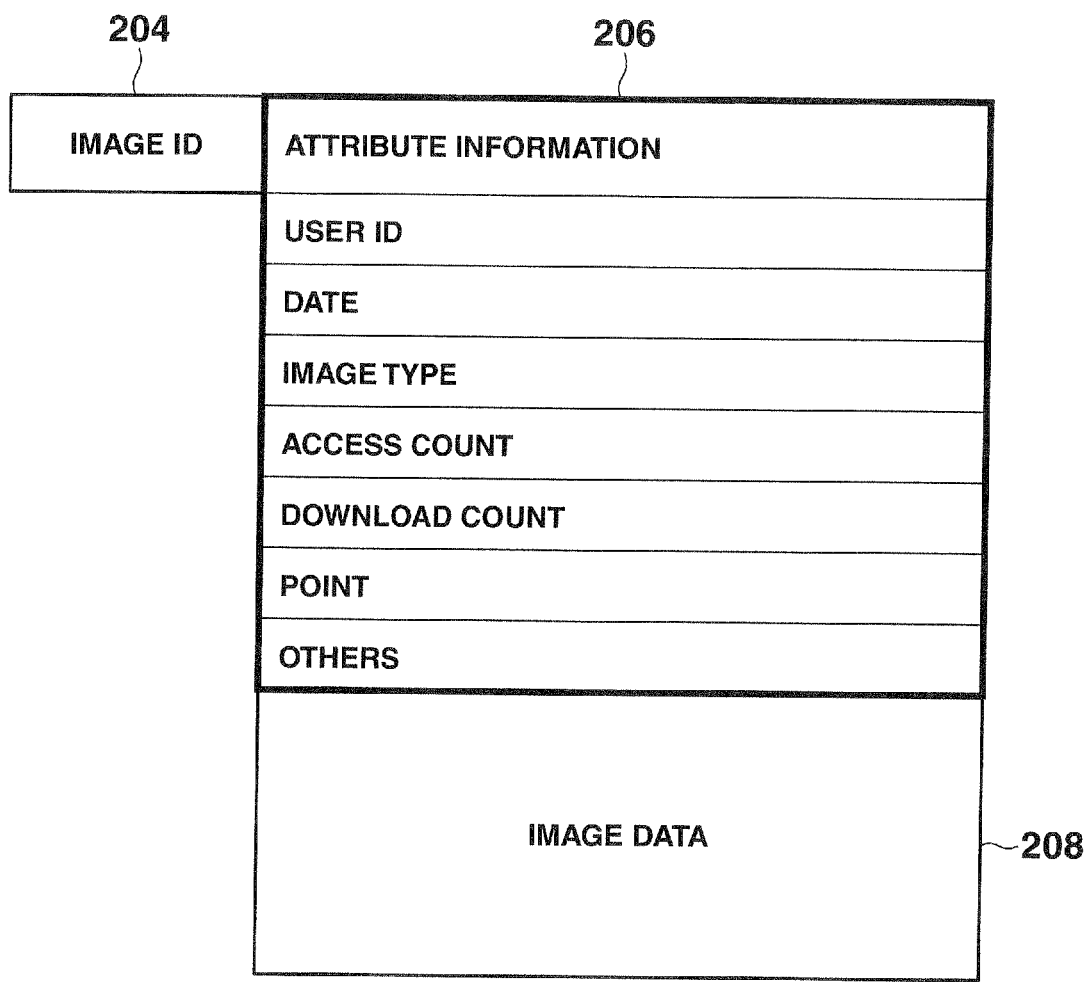
FIG. 4 is a view illustrating attribute information on an image ID.

The attribute information 206 includes, as shown in FIG. 4, the user ID indicating a contributor of the artwork, date information such as the creation date or posting date, image type information such as the type of painting tone, access count information indicating the number of times the artwork is browsed, download count information indicating the number of times the artwork is downloaded, point information indicating evaluation of the artwork, and other information specific to artworks. The creator of the artwork is known from the user ID and whether the creator is a pay member or premium member can be identified.

In the present embodiment, artworks are not displayed uniformly and instead, the display manner can be changed based on the "value" thereof. Examples of the value will be described later.

The control area 300 includes a snapshot-to-painting conversion processor 302, a parameter table 304, a display controller 308, an evaluation controller 310, and a membership management unit 312.

The snapshot-to-painting conversion processor 302 performs snapshot-to-painting conversion processing that converts image data stored in the artwork memory 108 into painting image data. The parameter table 304 stores parameters for snapshot-to-painting conversion referenced by the snapshot-to-painting conversion processor 302 to perform the snapshot-to-painting conversion processing. The display controller 308 stores a control program that causes a screen to display artworks.

The evaluation controller 310 evaluates artworks stored in the artwork memory 108 of the member area 100 based on the access count or the like and attaches a point to each artwork. The membership management unit 312 manages members based on the user ID and controls services separately for free members, pay members, and premium members. The membership management unit 312 also administers the social network service function of the server 11.

The server 11 includes a CPU 20 and a display buffer 30. The CPU 20 controls the whole server 11 (each unit described above) and also performs various kinds of processing needed to display many artworks on the Internet.

The CPU 20 also includes a graphic accelerator 22 to perform advanced graphic processing. As the graphic accelerator 22, for example, the NVIDIA GeForce (registered trademark) series, ATi RADEON (registered trademark), or open CL and extended libraries to use the open CL may be adopted.

The display buffer 30 or frame buffer is a work memory to generate images for the display when the CPU 20 causes a display screen to display many artworks.

Concrete operations of an image display system according to the present embodiment will be described below with reference to flow charts.

First, processes when an image is uploaded, displayed, browsed, and downloaded between the terminals 1-1, 1-2, 1-3, . . . and the server 11 on an image service site 10 will be described with reference to FIG. 5.

If the user is a member (a free member, pay member, or premium member), the user accesses the service site 10 from the terminal of the user (step SB1). The server 11 of the service site 10 authenticates the user ID after the user being logged in (step SC1) and, if it is verified that the user is a member, sends a page of the member so that the user can view the page (step SC2).

When the page of the member is opened, the member uploads an image (step SB2). The uploaded image is stored in the uploaded image memory 106 of the member area 100 of the server. If the member request a snapshot-to-painting conversion of the image (step S23), the server 11 performs the snapshot-to-painting conversion processing (or pictorial conversion processing) (step SC3) and the converted image, that is, the artwork is stored in the artwork memory 108.

The member may personally enjoy the converted artwork, but may post the artwork if the artwork is desired to be released to other users (step SB4). The posted artwork is transferred from the artwork memory 108 of the member area 100 to the artwork memory 202 of the common area 200 and stored therein. Incidentally, the attribute information 206 as described with reference to FIG. 4 is attached each artwork in the artwork memory 202.

The server 11 displays artworks in the artwork memory 202 if necessary (step SC4). Incidentally, the server 11 resizes artworks in the artwork memory 202 when displaying the artworks if appropriate. That is, because the size of artworks in the artwork memory 202 is normally larger than the image size for display, the artworks are reduced and if the size of artworks in the artwork memory 202 is smaller than the image size for display, the artworks are enlarged.

The member can browse any artwork displayed in an actual size by making a request of browsing (step SB5). If a browsing request is made, the server 11 displays the requested artwork in the actual size (step SC5) and also adds up a point to the artwork whose browsing is requested (step SC6).

The member may press a GOOD button displayed in the page of the member and indicating that the browsed artwork suits his (her) taste or write a comment such as his (her) impressions (step SB6). If the GOOD button is pressed or a comment such as impressions is written, the server 11 adds up a point to the browsed artwork (step SC6). The evaluation of the artwork is thereby raised. It is assumed that the point number of comment writing is higher than the point number of the GOOD button.

The member can also request a download of a browsed artwork (step SB7). If a download request is made by a member, the server 11 permits the download if necessary (step SC7) and the member can download a browsed artwork only if the download is permitted (step S188). The downloaded artwork is stored in the downloaded artwork memory 110 of the member area 100.

If a download request is made, the server 11 also adds up a point to the artwork (step SC8).

On the other hand, other users other than members, that is, any user can browse artwork stored in the artwork memory 202 of the common area 200 in a state of the display by appropriately accessing the service site (step SA1). Further, any user can also browse any artwork displayed in the actual size by making a request of browsing (step SA2).

Then, if any user presses the GOOD button because the browsed artworks suits his (her) taste (step SA3), the server 11 also adds up a point to the browsed artwork (step SC6).

Next, the technology of snapshot-to-painting conversion processing when the server 11 converts uploaded image data into a painting image will be described.

The snapshot-to-painting conversion is an image processing technology to convert each pixel constituting an original image such as a photo to an artwork according to predetermined parameters (snapshot-to-painting conversion parameters). The artwork includes an oil painting, thick oil painting, gothic oil painting, fauvist oil paining, water color painting, gouache pointing, pastel painting, color pencil sketch, pointilism, silkscreen, drawing, and air brush.

The technology of snapshot-to-painting conversion image processing converts an original image to an image looking like a painting basically by automatically adjusting/combining parameters of various kinds of effect processing known as photo retouch software.

Effect processing includes, for example, texture processing that provides a special texture by mapping the texture to an image and resolution processing that increases the texture and resolution by dividing an image into a contour portion, a texture portion such as a fine pattern, and a flat portion and performing appropriate processing on each portion. The effect processing also includes HSV processing that adjusts the color by dividing the color into three elements of the hue, saturation, and value, RGB processing that adjusts the degree of each color of R (red), G (green), and B (blue), and RGB substitution processing that makes a substitution in the direction of R to G, G to B, and B to R. The effect processing also includes an edge extraction, processing that applies a filter called Laplacian filter and an intermediate density extraction processing that applies a filter called a median filter. The effect processing also includes a density extraction processing that performs processing when a histogram in RGB of adjacent pixels is extracted to extract minimum/intermediate/maximum densities, an equalize processing that corrects the contrast or enlarges an image's histogram by setting the darkest portion of an image as black, the brightest portion as white, and appropriately distributing a histogram therebetween, a gamma correction processing that adjusts an intermediate brightness while maintaining a bright portion and a dark portion, and a shadow processing that brightens a dark portion of an image or darkens a bright portion thereof. The effect processing also includes a solarization processing that when the RGB value of each pixel is brighter than a threshold, inverts the RGB value thereof and a noise addition processing that adjusts the quantity and color of noise by randomly drawing dots to cause noise.

The effect processing also includes an effect processing called HDR (High Dynamic Range) in which a photo with a wide dynamic range that cannot be expressed by an ordinary photo is compressed into a narrow dynamic range width through tone mapping to correct whiteout due to overexposure and black crushing due to underexposure so that power of expression is increased. By applying this effect processing, an image realizing a new photo expression that brings a photo closer to memories or impressions a person's brain has received and adds an artistic expression can be obtained.

That is, the snapshot-to-painting conversion processing is in principle a kind of effect processing and a snapshot-to-painting conversion algorithm creates various kinds of painting tone by appropriately combining effect processing and parameters and is programmed as the snapshot-to-painting conversion processing.

In the conversion algorithm, a parameter group P, which is a set of the parameters to convert pixels of an original image, is prepared in advance. If there are 12 kinds of painting tones, parameter groups are represented as P1 to P12. How to determine parameters also changes the tone of a converted image. If the parameter group for the conversion into an oil painting tone is P1 and there are m parameters in P1 needed for effect processing convert an image so as to look like a painting tone image, the parameter group P1 contains a plurality of parameters $P1_1$ to $P1_m$.

The snapshot-to-painting conversion algorithm described above in detail is stored in the snapshot-to-painting conversion processor 302 of the control area 300 of the server 11 and parameter groups are similarly stored in the parameter table 304 of the control area 300.

Figure 6:
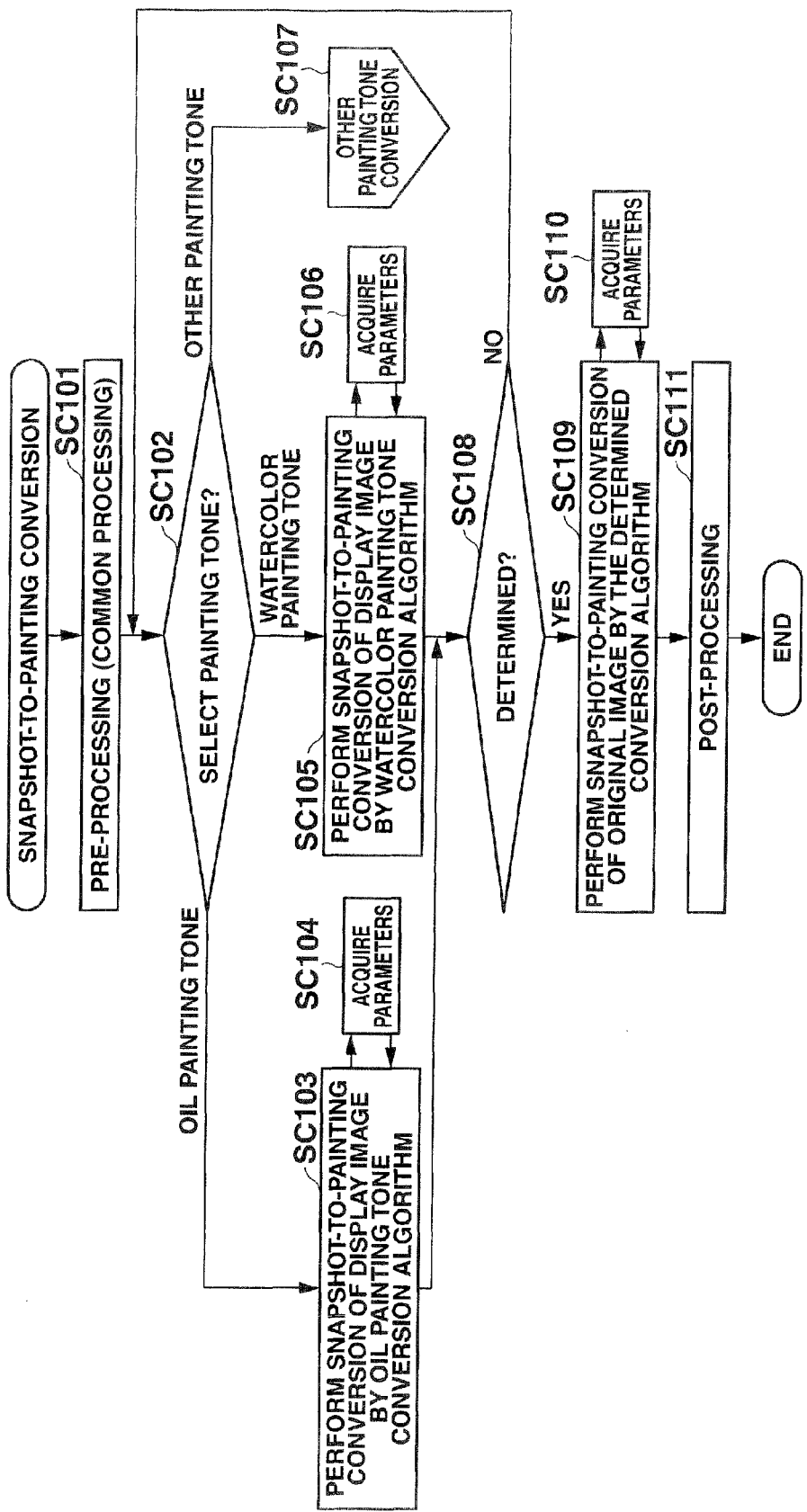
FIG. 6 is a flowchart illustrating snapshot-to-painting conversion processing in the server.

FIG. 6 is a flow chart for performing snapshot-to-painting conversion processing by the snapshot-to-painting conversion processor 302 of the server 11. As shown in FIG. 6, the snapshot-to-painting conversion processor 302 first performs pre-processing (step SC101). This step is processing performed commonly regardless of the type of painting tone. The effect processing described above is performed on each pixel and thus, image data needs to be in bitmap format. Thus, image data normally in JPEG format is converted into the bitmap format.

In addition, uploaded image data has various sizes and thus, the snapshot-to-painting conversion processor 302 resizes the image data to the number of pixels in the display area, for example, 800×600 pixels. A large image is reduced and a small image is enlarged. This is because if the size is determined, parameters only need to be fixed and processing is more efficient. Needless to say, when a snapshot-to-painting conversion of an original image described later is made, the snapshot-to-painting conversion occurs in the size in which image data is uploaded.

Subsequently, the snapshot-to-painting conversion processor 302 causes the user to select the desired painting tone from the oil painting, thick oil painting, gothic oil painting, fauvist oil paining, water color painting, gouache painting, pastel painting, color pencil sketch, pointilism, silkscreen, drawing, and air brush (step SC102).

If the painting tone is selected, the snapshot-to-painting conversion processor 302 proceeds to the flow of each painting tone conversion algorithm. If, for example, the oil painting tone is selected, the snapshot-to-painting conversion processor 302 proceeds to step SC103 and if the watercolor painting tone is selected, the snapshot-to-painting conversion processor 302 proceeds to step SC105. Otherwise, the snapshot-to-painting conversion processor 302 proceeds to the flow of other painting tone conversion algorithms (step SC107). Incidentally, when executing each algorithm, the snapshot-to-painting conversion processor 302 references the parameter table 304 of the control area 300 (steps SC104, SC106).

In the processing in steps SC103, SC105, SC107, the snapshot-to-painting conversion processor 302 makes a snapshot-to-painting conversion intended for image data of the display screen size. If a decision is instructed from the terminal 1-1 of the user (step SC108: YES), proceeds to the snapshot-to-painting conversion of the original image (step SC109) and, if redoing in another painting tone is instructed (step SC108: NO), returns to the processing in step SC102.

For the snapshot-to-painting conversion of the original image in step SC109, the snapshot-to-painting conversion processor 302 performs painting tone conversion processing on the original image based on the painting tone conversion algorithm determined in step SC108 while referencing the parameter table 304 (steps SC104, SC106). If the image sizes are different, appropriate parameters are different even if the painting tone is the same and thus, the parameter table used in step SC109 is different from parameters used in step SC104 or SC106.

Then, the snapshot-to-painting conversion processor 302 performs post-processing to convert the converted original image back to the JPEG format (step SC111).

An operation of the server 11 in the case that the user downloads any artwork will be described below. A membership registration is required for the user to download the artwork.

Figure 7:
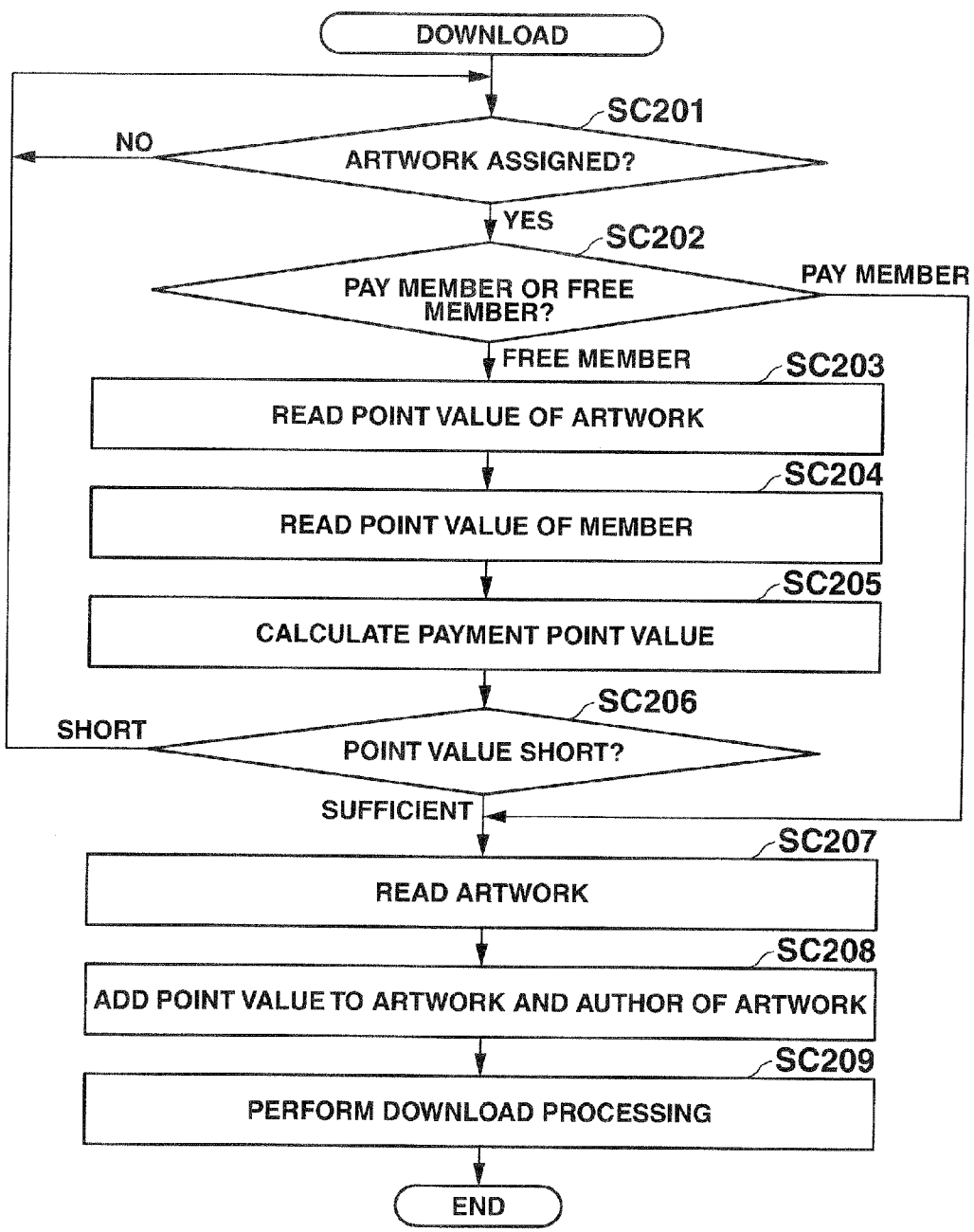
FIG. 7 is a flowchart illustrating an operation relating to image download of a terminal from the server, which is common to each embodiment.

FIG. 7 is a flowchart illustrating processing (step SB8 in FIG. 5) relating to the download in the server 11. The processing in FIG. 7 is performed by the CPU 20, evaluation controller 310, and membership management unit 312 of the server 11.

In the server 11, when the member assigns the artwork to be downloaded (step SC201), the membership management unit 312 determines whether the user is the pay member (in this case, the normal pay member and the premium member) or the free member (step SC202). When the member is the pay member, the processing goes to step SC207.

On the other hand, when the member is the free member, the point value corresponding to the evaluation of the artwork is read from the attribute information 206 on the artwork (step SC203), and the point value possessed by the member who downloads the artwork is read from the attribute information of the member for downloading the artwork (step SC204).

A payment point value is calculated from a balance between the point value (corresponding to the price) of the artwork and the point value possessed by the member (step SC205). When the balance is satisfied, the processing goes to step SC207. Because the artwork cannot be downloaded when the balance is insufficient, the processing returns to step SC201 to cause the user to select another artwork.

In the server 11, the CPU 20 reads the artwork assigned by the user from the artwork memory 108 of another user who is an author of the artwork (step SC207), and the evaluation controller 310 adds the point value to the artwork and the author of the artwork (step SC208). That is, in the member (the free member, the normal pay member, and the premium member), the evaluation of the own artwork is enhanced with increasing number of downloaded artworks, and the point value of the member is earned by adding the point value to the point value area of the attribute information on the user ID of the member who is the author.

Then, in the server 11, the CPU 20 performs download processing of storing the artwork read in step SC207 in the downloaded artwork memory 110 of the user who makes the request for the download (step SC209).

A specific operation in the case (steps SC4 and SC5 in FIG. 5) that, after displaying many artworks on the Internet, the server 11 displays any artwork (original image) by a browsing request from any user will be described below.

Figure 8:
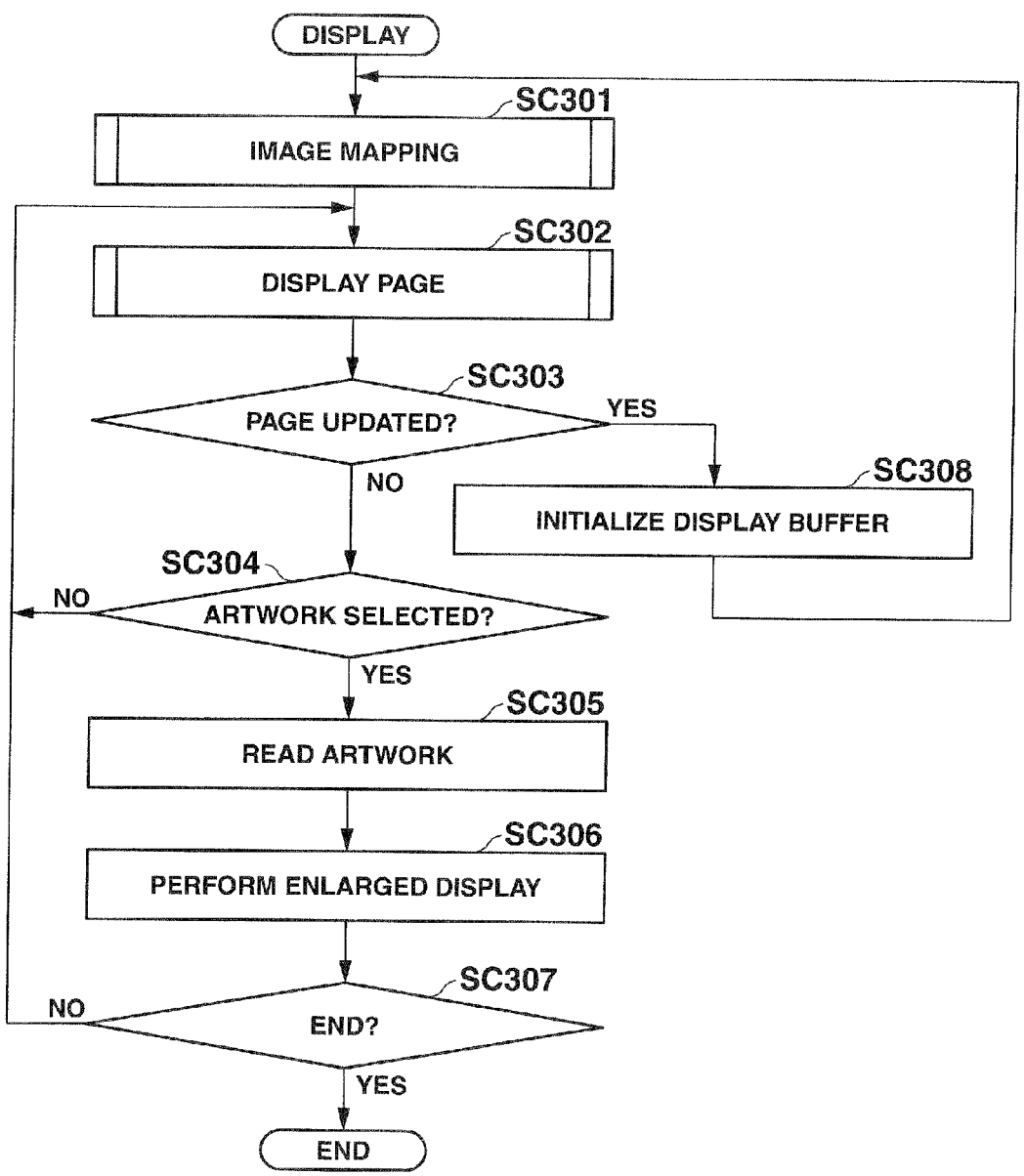
FIG. 8 is a flowchart illustrating screen display processing when the server displays many artworks in a first embodiment.

FIG. 8 is a flowchart illustrating screen display processing relating to the display of the artworks, which is performed by the CPU 20.

In the screen display processing, the CPU 20 performs image mapping processing (step SC301) and page display processing (step SC302). The image mapping processing and the page display processing are the display of the artworks (SC4) in FIG. 5 and the processing of displaying the many artworks on the screen of the terminal 1 of the user who accesses the image service site 10.

Figure 14:
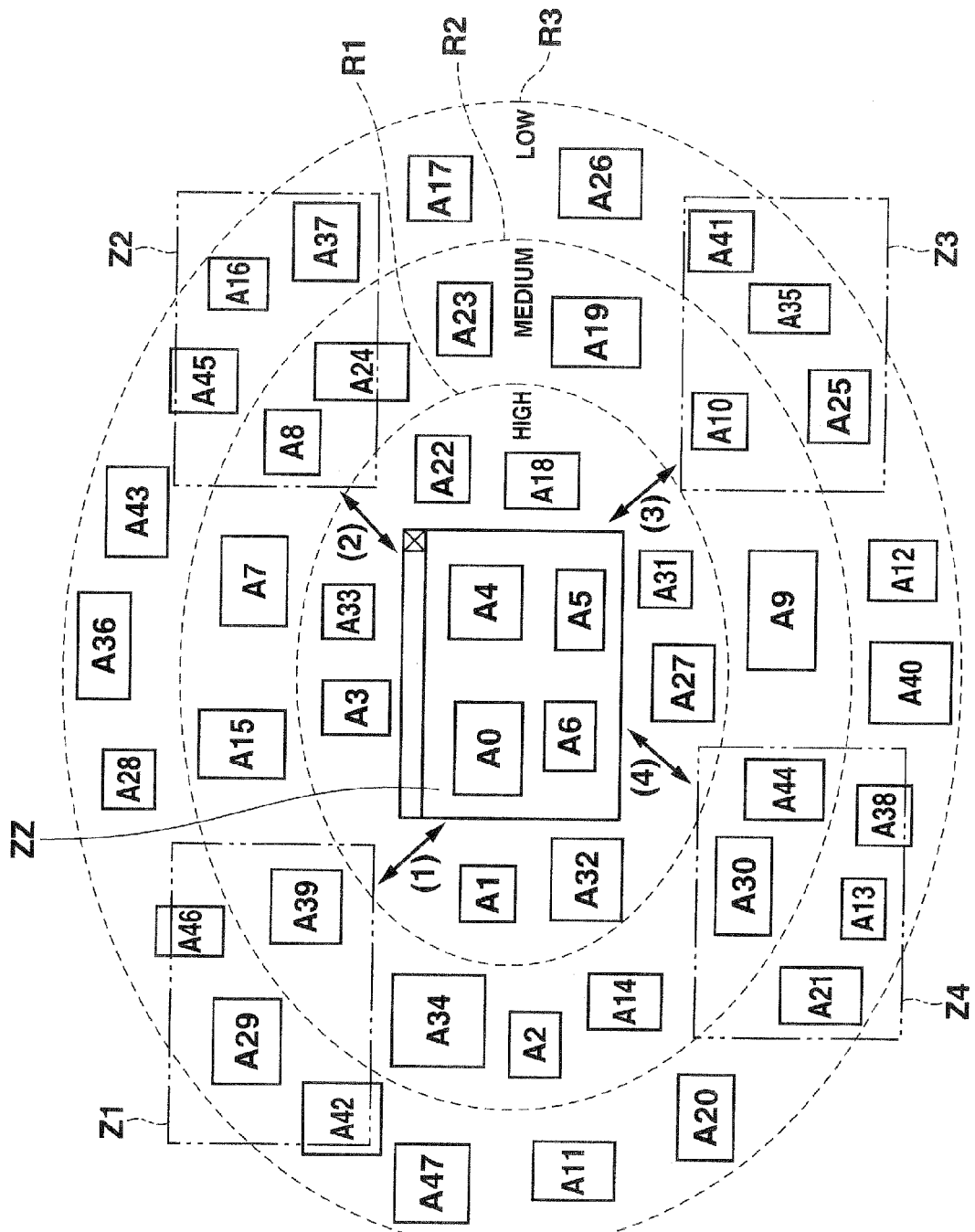
FIG. 14 is a conceptual view illustrating a relationship between virtual artworks laid out in a space and a display region frame.

The image mapping processing in SC301 will be described. Schematically the image mapping processing is processing of previously laying out the image data of the artwork group, which should be set to a display candidate, in a virtual space of the display buffer 30 before the many artworks, which are posted on the server 11 and stored in the artwork memory 202, is actually displayed. FIG. 14 is a conceptual view illustrating a state in which the artwork group that should be set to the display candidate is laid out in the virtual space through the image mapping processing.

Figure 10:
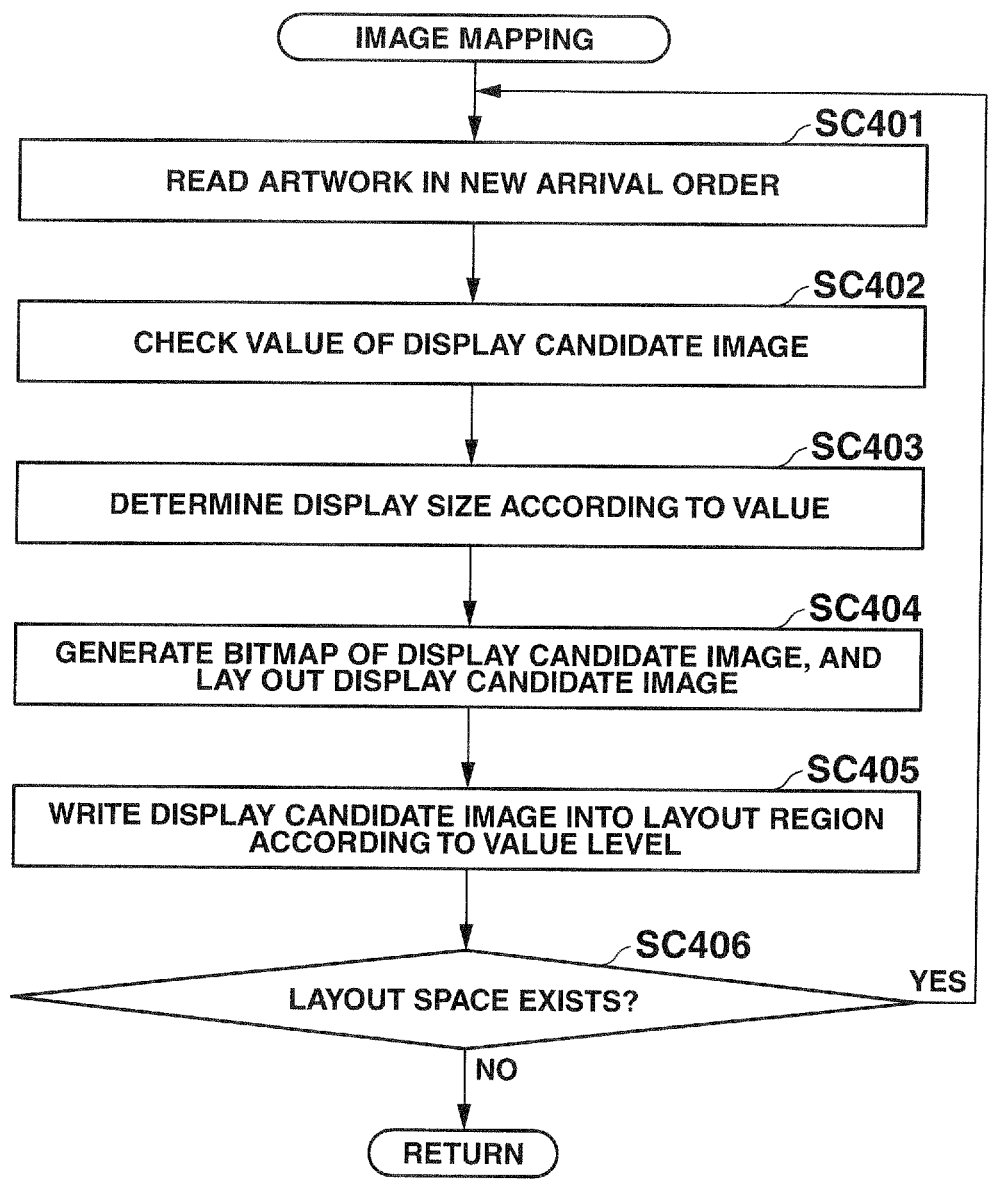
FIG. 10 is a flowchart illustrating image mapping processing in the display processing.

The detailed content of the image mapping processing will be described with reference to a flowchart in FIG. 10. In the image mapping processing, the CPU 20 reads the items of image data of the artworks, which should be set to the display candidate, from many items of image data (JPEG data), which are posted on the server 11 and stored in the artwork memory 202, in a new arrival order (step SC401). The order in which the items of image data of the artworks are read is not limited to the new arrival order, but the items of image data of the artworks may randomly be read.

The CPU 20 checks value of the artwork of which the image data is read (step SC402). The value of the artwork means a general term of information, such as the point value that is of one of the items of attribute information attached to each artwork, the number of access times, the number of download times, and the membership type of the author of each artwork, which weighs the artwork.

In the first embodiment, it is assumed that the value of artwork is the point value after the point value of each artwork is multiplied by a multiplying factor corresponding to the membership type. At this point, for example, the multiplying factor corresponding to the membership type is one when the author of the artwork is the free member, the multiplying factor is double when the author is the normal pay member, and the multiplying factor is triple when the author is the premium member.

Figure 13:
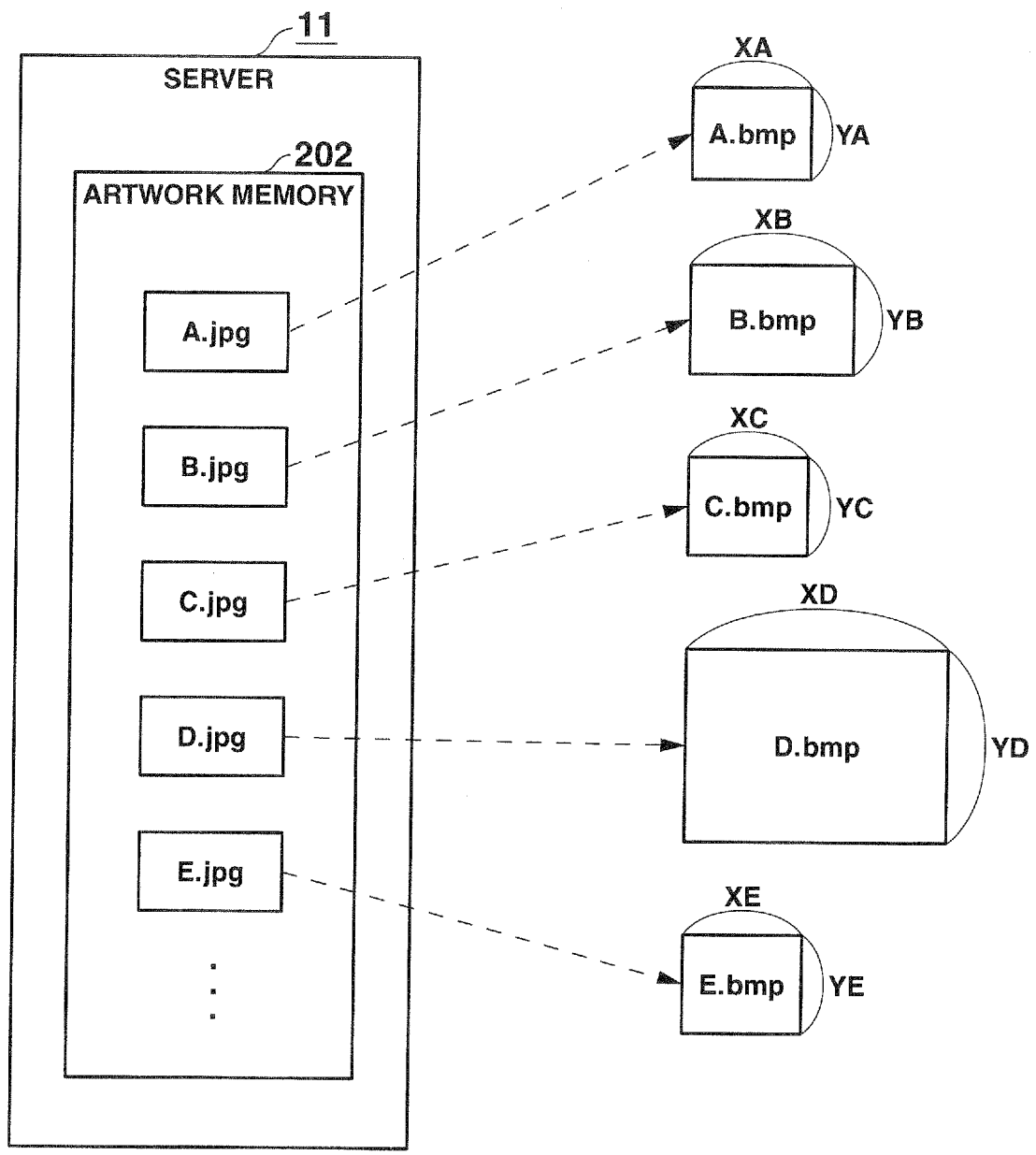
FIG. 13 is an explanatory view illustrating a difference in size according to a value of an image.

Then the CPU 20 determines a display size of the artwork according to the checked value (step SC403). As illustrated in FIG. 13, the many posted artworks are stored in the artwork memory 202 of the common area 200 of the server 11 in the JPEG format, and the size of the artwork that becomes the display target is not always kept constant. In step SC403, the CPU 20 determines the display size of the artwork which becomes the display target according to the value of the artwork.

In determining the display size, the CPU 20 relatively enlarges the display size of the artwork with increasing value of the artwork. Specifically, for example, a minimum display size and a maximum display size, which are of references, are previously determined. The multiplying factor proportional to the value of the artwork is obtained using a predetermined calculating formula, and the minimum display size is multiplied by the multiplying factor to calculate the display size corresponding to the value of the artwork. When the calculated display size is less than or equal to the maximum display size, the display size is determined as display size of the artwork. When the calculated display size is more than the maximum display size, the maximum display size is determined as the display size of the artwork.

Then the CPU 20 writes the image data read in step SC401 as bitmap data of the determined display size into the display buffer 30 (step SC404). FIG. 13 illustrates a difference in display size of the post-bitmap artwork in the case that the value of an artwork D is the highest in artworks A, B, C, D, and E, that the value of the artwork B is the second highest, and that the value of each of the artworks A, C, and B is the lowest.

Then the CPU 20 writes the post-bitmap image data into a specific layout region, which is the region set in the virtual space of the display buffer 30 and corresponds to a value level of the artwork checked in step SC402 (step SC405).

As used herein, the specific layout region means one of plural layout regions having a multiple structure previously set in the virtual space. In the first embodiment, as illustrated in FIG. 14, the plural layout regions have the triple structure including an ellipsoidal first layout region R1 located in the center, a second layout region R2 that is located outside of the first layout region R1 with a given a width, and a third layout region R3 that is located outside of the second layout region R2 with a given width. The center of the first layout region R1, namely, the centers of all the layout regions R1, R2, and R3, are matched with the center of the virtual space.

The value level of the artwork is a corresponding level in the case that the value of the artwork is classified by the number of steps equal to the number of layout regions. In the first embodiment, the value level of the artwork includes a high level, a medium level, and a low level.

In step SC405, the CPU 20 writes the image data of the artwork in which the value level is the high level into the first layout region R1, writes the image data of the artwork in which the value level is the medium level into the second layout region R2, and writes the image data of the artwork in which the value level is the low level into the third layout region R3.

Until a space in which the image data of the new artwork is laid out exists in the layout regions R1, R2, and R3 (YES in step SC406), the CPU 20 writes the items of image data of the artworks into the layout regions R1, R2, and R3 by repeating the items of processing in steps SC401 to SC405.

The CPU 20 ends the image mapping processing at the time the layout space is eliminated in the layout regions R1, R2, and R3 (NO in step SC406). At this point, all the artwork groups laid out in the first to third layout regions R1, R2, and R3 become the display candidates. The artwork group that becomes the display candidate is maintained in the state of the display candidate if the user issues a page update instruction.

The page display processing in step SC302, which is performed subsequent to the image mapping processing by the CPU 20, will be described below. Schematically the page display processing is processing of setting a display region frame ZZ in the virtual space as illustrated in FIG. 14 and actually displaying the artworks laid out in a region (hereinafter referred to as a display target region) corresponding to the display region frame ZZ.

Figure 15A:
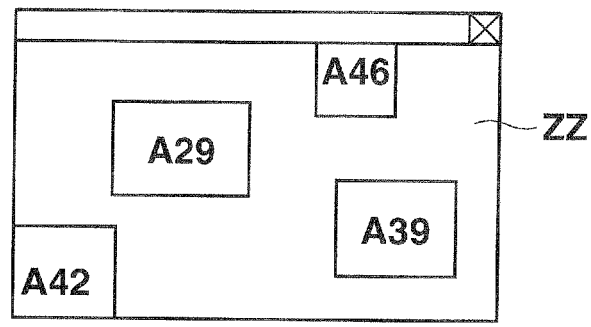
FIGS. 15A, 15B, 15C, and 15D are views illustrating a change of a display image when the server displays many artworks.
Figure 15B:
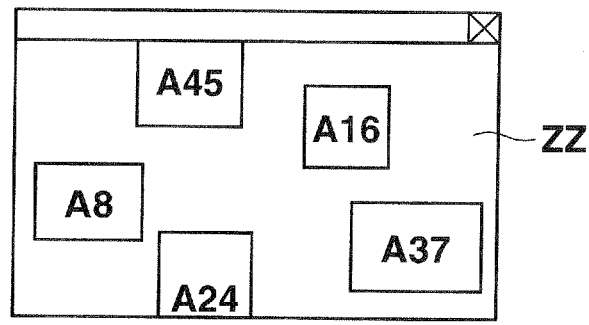
Figure 15C:
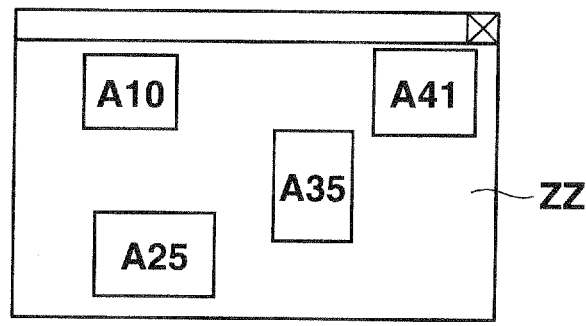
Figure 15D:
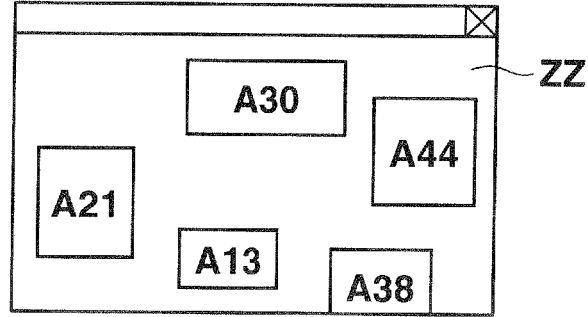

The CPU 20 repeatedly performs the page display processing to randomly move a position of the display region frame ZZ, thereby automatically switching the artworks, of which the artworks are displayed, as illustrated in FIGS. 15A to 15D. That is, when the display target region is located in the a first region. Z1 in FIG. 14 at any processing timing, artworks A42, A29, A46, and A39 are displayed on the screen as illustrated in FIG. 15A. When the display target region is located in a second region Z2 in FIG. 14, artworks A8, A45, A24, A16, and A37 are displayed on the screen as illustrated in FIG. 15B. When the display target region is located in a third region Z3 in FIG. 14, artworks A10, A25, A35, and A41 are displayed on the screen as illustrated in FIG. 15C. When the display target region is located in a fourth region Z4 in FIG. 14, artworks A13, A21, A30, A38, and A44 are displayed on the screen as illustrated in FIG. 15D.

FIG. 14 and FIGS. 15A to 15D conveniently illustrate a relationship between the virtual space and many artwork groups. Obviously the number of artwork groups in each drawing differs from the actual number of artwork groups.

The detailed content of the page display processing will be described below with reference to a flowchart in FIG. 11. In the page display processing, the CPU 20 checks whether current processing timing is initial page display timing (step SC501). As used herein, the initial page display timing means processing timing immediately after the image mapping processing is performed, and timing in which the artworks are initially displayed to any user or processing timing immediately after the user issues the page update instruction described below.

When the current processing timing is the initial page display timing (YES in step SC501), the CPU 20 sets the display region frame ZZ to the center position of the first layout region R1 as illustrated in FIG. 14 (step SC502).

A size of the display region frame ZZ is fixed. In the first embodiment, when the display region frame ZZ is set to the center position of the first layout region R1, the size of the display region frame ZZ includes the artworks laid out in the first layout region R1.

Then the CPU 20 displays the artworks, which are laid out in the display target region corresponding to the display region frame ZZ in the virtual space (step SC508), and tentatively ends the page display.

When the current processing timing is not the initial page display timing but a plurality of the artworks are already displayed (NO in step SC501), the CPU 20 checks whether a predetermined one-time display time (for example, several seconds) elapses since the previous processing timing (step SC503). When the display time does not elapse (NO in step SC503), the page display processing is immediately ended. Therefore, the display states of the artworks displayed in any processing timing are maintained for a given time.

On the other hand, when the one-time display time elapses since the previous processing timing (YES in step SC503), the CPU 20 increments a count value N of a control counter (step SC504), and performs display region frame setting processing (step SC505). The count value N of the control counter is stored in a work memory of the CPU 20.

Figure 12:
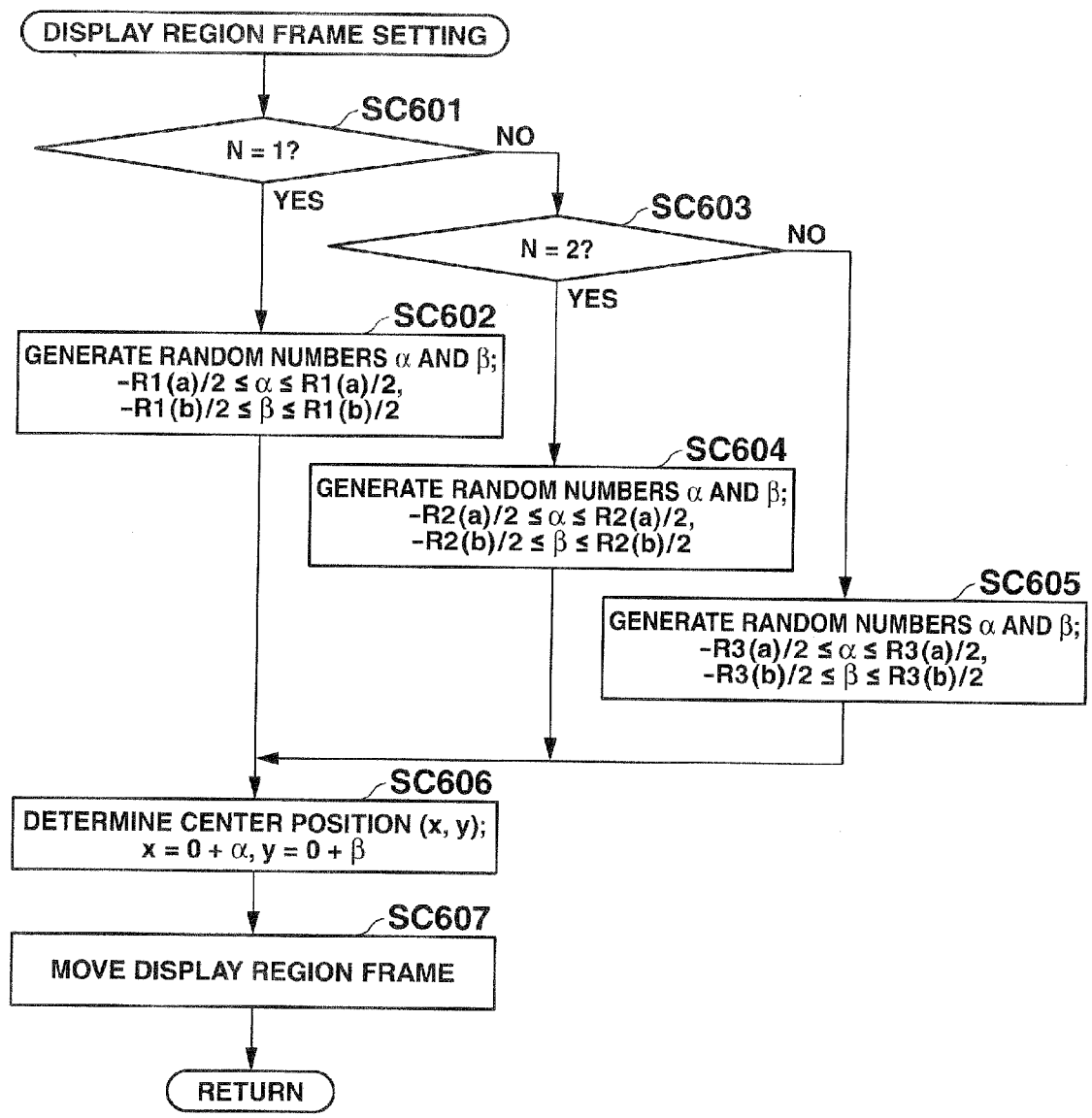
FIG. 12 is a flowchart illustrating display region frame setting processing in the page display processing.

FIG. 12 is a flowchart illustrating a content of the display region frame setting processing. The display region frame setting processing is processing of randomly moving the setting position of the display region frame ZZ (FIG. 14).

In the display region frame setting processing, the CPU 20 generates random numbers $\alpha$ and $\beta$ while changing a range of a generated numerical value according to the count value N of the control counter. The random numbers $\alpha$ and $\beta$ are used to determine any coordinate position (x, y) of an xy-coordinate space in which the center of the virtual space is set to an origin. Specifically, the random numbers $\alpha$ and $\beta$ express a distance in an xy-direction from the origin to any coordinate position (x, y), the random number $\alpha$ is the distance in the x-axis direction, and the random number $\beta$ is the distance in the y-axis direction.

When the count value N is 1 (YES in step SC601), the CPU 20 generates the random numbers $\alpha$ and $\beta$ within the following ranges (step SC602). Where R1(a) is a length (an outer diameter in the x-axis direction) of a long axis of the first layout region R1 in the virtual space and R1(b) is a length (an outer diameter in the y-axis direction) of a short axis.

$-R1(a)/2 \leq \alpha \leq R1(a)/2$ $-R1(b)/2 \leq \beta \leq R1(b)/2$

When the count value N is 2 (YES in step SC603), the CPU 20 generates the random numbers $\alpha$ and $\beta$ within the following ranges (step SC604). Where R2(a) is a length (an outer diameter in the y-axis direction) of the long axis of the second layout region R2 in the ellipsoidal virtual space and R2(b) is a length (an outer diameter in the y-axis direction) of the short axis.

$-R2(a)/2 \leq \alpha \leq R2(a)/2$ $-R2(b)/2 \leq \beta \leq R2(b)/2$

When the count value N is 3 (NO in step SC603), the CPU 20 generates the random numbers $\alpha$ and $\beta$ within the following ranges (step SC605). Where R3(a) is a length of the long axis of the third layout region R3 in the virtual space and R3(b) is a length of the short axis.

$-R3(a)/2 \leq \alpha \leq R3(a)/2$ $-R3(b)/2 \leq \beta \leq R3(b)/2$

The CPU 20 sets the random numbers $\alpha$ and $\beta$ within the range corresponding to the count value (N) to the distance in the xy-direction from the origin, and obtains any coordinate position (x, y) in the virtual space from the following equations (step SC606).

$x = 0 + \alpha$ $y = 0 + \beta$

The CPU 20 acquires any coordinate position in the rectangular region circumscribing the first layout region C1 when the count value N of the control counter is 1, the CPU 20 acquires any coordinate position in the rectangular region circumscribing the second layout region R2 when the count value N of the control counter is 2, and the CPU 20 acquires any coordinate position in the rectangular region circumscribing the third layout region R3 when the count value N of the control counter is 3.

Then the CPU 20 moves the display region frame ZZ in she virtual space to the position in which the center of the display region frame ZZ becomes the coordinate position (x, y) acquired in step SC606 (step SC607). That is, in the three different regions, a specific region corresponding to the count value (N) is set to a candidate of a moving destination, and the display region frame ZZ is randomly moved to any position.

Figure 11:
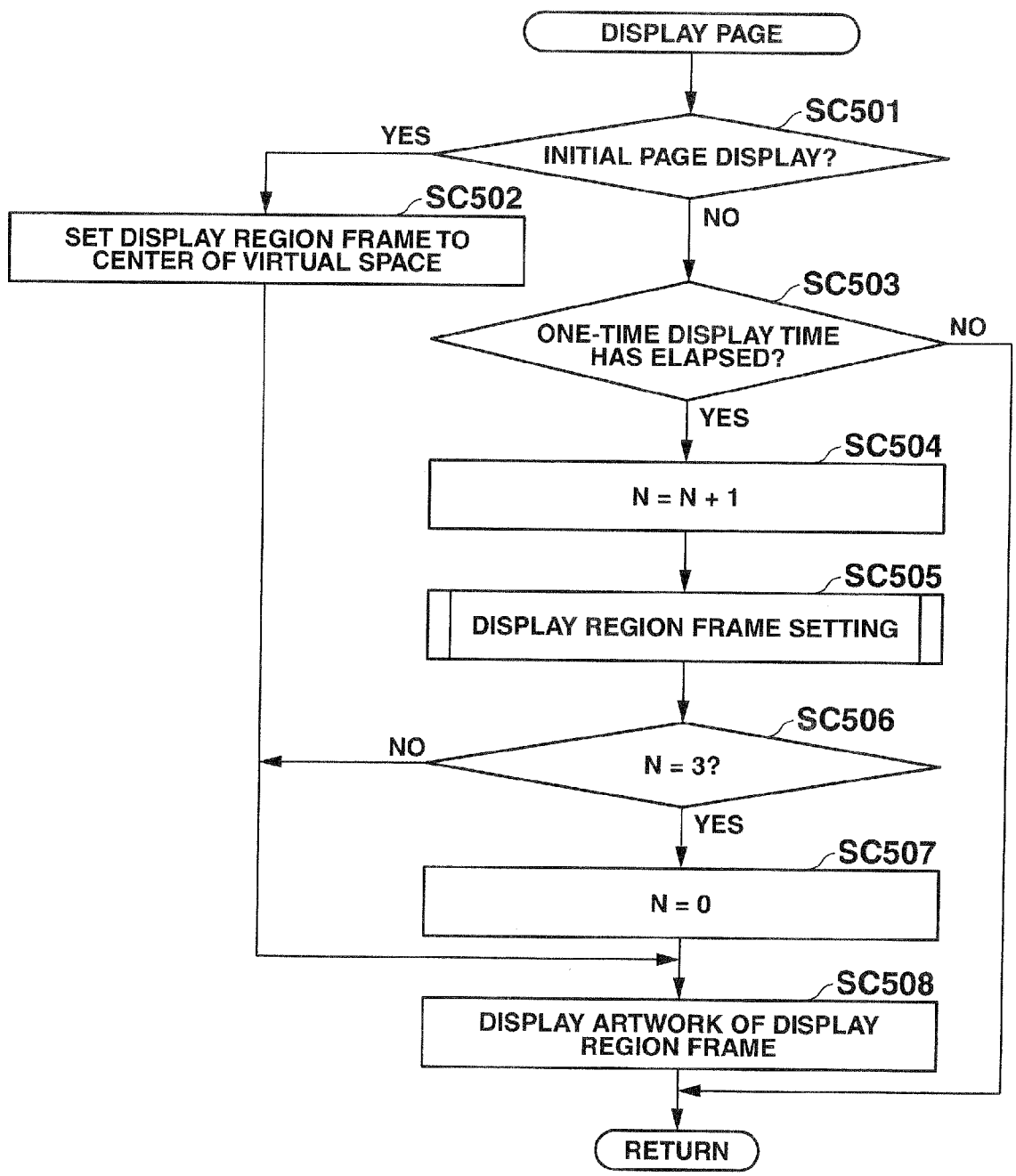
FIG. 11 is a flowchart illustrating page display processing in the display processing.

When returning to the processing in FIG. 11 after the display region frame ZZ is moved, the CPU 20 checks whether the current count value N of the control counter reaches 3 (step SC506). When the count value N does not reach 3 (NO in step SC506), the CPU 20 immediately displays the artworks laid out in the display target region corresponding to the display region frame ZZ (step SC508). That is, the artworks are displayed as illustrated in one of FIGS. 15A to 15D.

When the count value N reaches 3 (YES in step SC506), the CPU 20 resets the count value N to zero (step SC507), and displays the artworks laid out in the display target region corresponding to the display region frame ZZ (step SC508). Then the CPU 20 returns to the processing in FIG. 8.

Therefore, in the screen display processing, the display region frame ZZ is randomly moved in each time the page display processing is performed, thereby randomly changing the artwork group displayed on the screen.

In the page display processing, the count value N of the control counter changes circularly from 1 to 3 in each item of processing timing, and the display region frame ZZ is randomly moved while the specific region corresponding to the count value N in the three different regions is set to the candidate of the moving destination.

At this point, the three different regions are the rectangular region circumscribing the first layout region R1, the rectangular region circumscribing the second layout region R2, and the rectangular region circumscribing the third layout region R3. Therefore, while the page display processing is repeatedly performed, the artwork group laid out in the first layout region R1 becomes the display candidate every time, almost all artworks in the artwork group laid out in the second layout region R2 becomes the display candidate in two out of three, and almost all artworks in the artwork group laid out in the third layout region R3 becomes the display candidate once every three times.

That is, the artwork group laid out in the first layout region R1 has the highest probability of actually displaying the artwork in the page display processing, the artwork group laid out in the second layout region R2 has the second highest probability, and the artwork group laid out in the third layout region R3 has the lowest probability.

Figure 5:
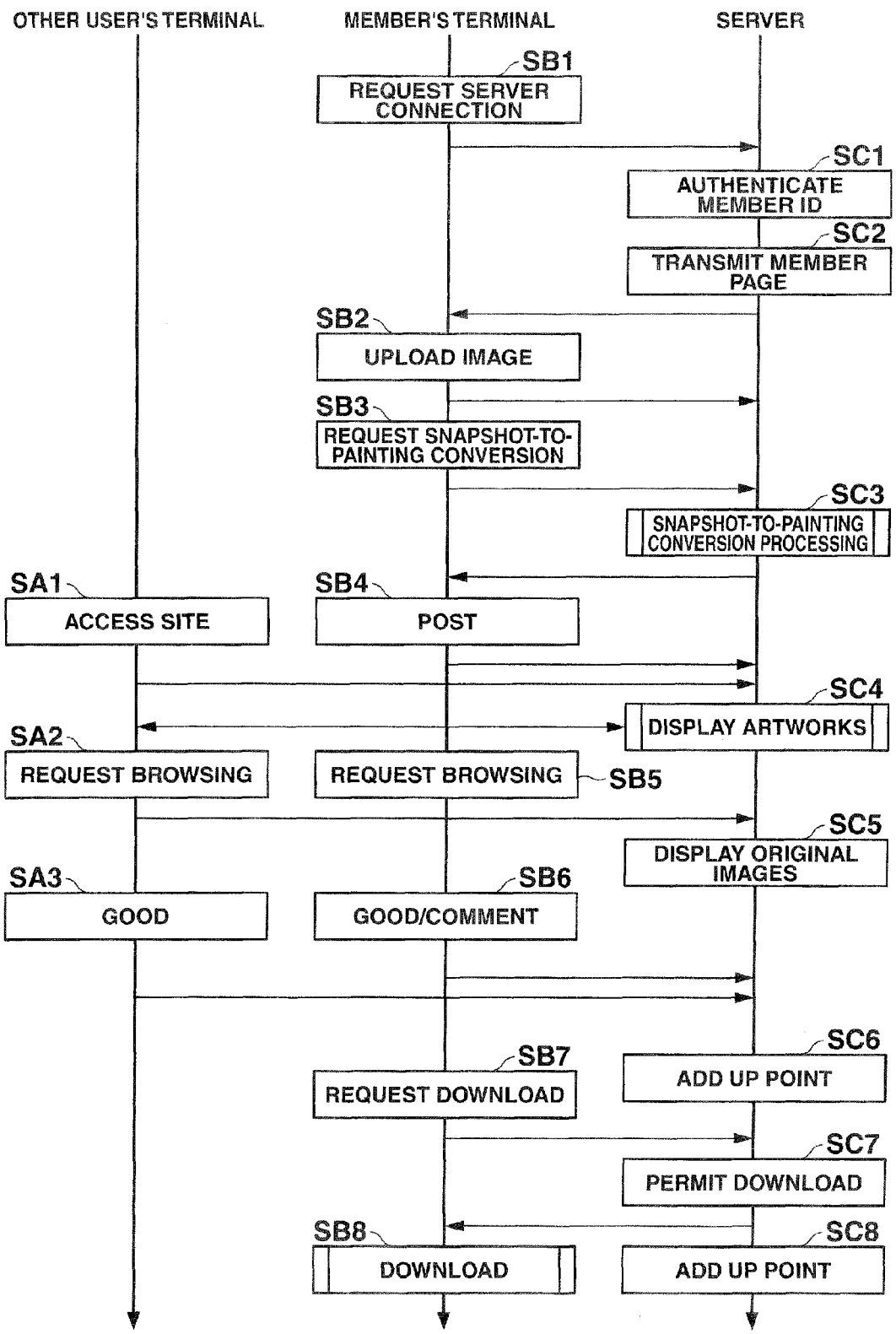
FIG. 5 is a flowchart illustrating a data exchange between a terminal and a server, which is common to each embodiment.

The image mapping processing and the page display processing constitute the display processing (SC4) in FIG. 5 of displaying the artworks on the screen of the terminal 1-1 of the user who accesses the image service site 10.

Then, as illustrated in FIG. 8, the CPU 20 repeatedly performs the page display processing to selectively display the display candidate laid out in any position from many display candidates previously laid out in the virtual space, thereby automatically and randomly switching the artworks displayed as illustrated in one of FIGS. 15A to 15D.

When the user issues the page update instruction (YES in step SC303) while the artworks are displayed through the page display processing, the CPU 20 tentatively initializes the display buffer 30 (step SC308), and performs the image mapping processing again. That is, all the artworks, which are laid out as the display candidate in the virtual space until just before, are changed to new artworks. Then, the CPU 20 performs the page display processing again to selectively display the artworks from the new artwork group.

When the user selects one of the currently-displayed artworks (YES in step SC304) while the artworks are displayed through the page display processing, the CPU 20 reads the image data of the artwork from the artwork memory 202 to perform enlarged display of the read image data of the artwork (step SC306). The processing in step SC306 is processing of displaying the real size of the artwork, which is selected by the user, on the screen of the terminal 1 of the user who accesses the image service site 10.

Until the user issues an instruction to end the display (NO in step SC307), the CPU 20 repeatedly performs the page display processing in step SC302 to automatically switch the displayed artwork at given time intervals. When the user issues the instruction to end the display (YES in step SC307), the CPU 20 ends the screen display processing.

As described above, in the first embodiment, the artworks (images) stored in the server 11 are displayed while the artworks are randomly changed, and the probability of displaying the artworks is increased with increasing value of the artwork. Therefore, the image stored in the server through the network can efficiently be displayed such that the interest of the user is awaken.

In the first embodiment, the value of the artwork is increased with increasing point value of the artwork, the value of the artwork produced by the author of the normal pay member is set higher than the value of the artwork produced by the author of the free member, and the value of the artwork produced by the author of the premium member is set higher than the value of the artwork produced by the author of the normal pay member. Accordingly, the artworks having the higher point values are preferentially displayed with the higher probability rather than the artworks having the relatively lower point values, the artworks produced by the author of the normal pay member are preferentially displayed with the higher probability rather than the artworks produced by the author of the free member, and the artworks produced by the author of the premium member are preferentially displayed with the higher probability rather than the artworks produced by the author of the normal pay member.

In the first embodiment, the value of each artwork is determined based on the point value the artwork and the membership type of the author of the artwork. The value of each artwork may be determined as follows. The value of each artwork may be determined by one of items of attribute information on the point value, the number of access times (browsing times), and the number of downloaded times of the artwork, plural items of attribute information, or only the membership type of the author of the artwork. The value of each artwork may be determined by the membership type of the author of the artwork and one of items of attribute information except the number of downloaded times. The value of each artwork may be determined by the membership type of the author of the artwork and plural items of attribute information.

In the first embodiment, the display states of the artworks displayed in arbitrary display timing are maintained only for a given time (one-time display time). That is, the display state of the artwork group is always maintained only for a given time irrespective of the layout region where the artworks are laid out, namely, irrespective of the value level of the artwork. Alternatively, the artwork group in which the display state is maintained only for a given time may be limited only to the artworks belonging to the high value level. The time for which the display state is maintained may be changed according to the value or the value level of the artworks displayed. That is, the display time of the artwork having the high value level or the higher value may relatively be lengthened.

In the first embodiment, the displayed artwork group is switched at constant time intervals by moving the display region frame ZZ to the new position at constant time intervals. Alternatively, for example, the display region frame ZZ is slightly moved in any direction, namely, the display region frame ZZ is moved so as to drift in the virtual space, and the actually-displayed artwork group may slightly be changed such that the artwork groups are sequentially displayed in the display region frame ZZ.

In this case, the range where the display region frame ZZ is movable is set to the first layout region R1 (or the rectangular region circumscribing the first layout region R1), the range is enlarged into the second layout region R2 (or the rectangular region circumscribing the second layout region R2) at a given frequency, and the range is further enlarged into the third layout region R3 (or the rectangular region circumscribing the third layout region R3) at a lower frequency. That is, in the virtual space, the display region frame ZZ (specifically, the center of the display region frame ZZ or the whole the display region frame ZZ) is moved so as to drift in the first layout region R1 for a relatively high degree of importance, the display region frame ZZ is sometimes moved to the second layout region R2 for a relatively low degree of importance, and the display region frame ZZ is rarely moved to the second layout region R2 for the relatively lowest degree of importance. Therefore, the probability of displaying the artworks may be increased in the descending order of the artwork group of the third layout region R3, the artwork group of the second layout region R2, and the artwork group of the first layout region R1.

In the first embodiment, during the screen display processing, the CPU 20 sets all the artworks, which are posted on the server 11 and stored in the artwork memory 202, to the display target. Alternatively, the artwork set to the display target may be limited to the artwork having a specific painting tone.

Figure 9:
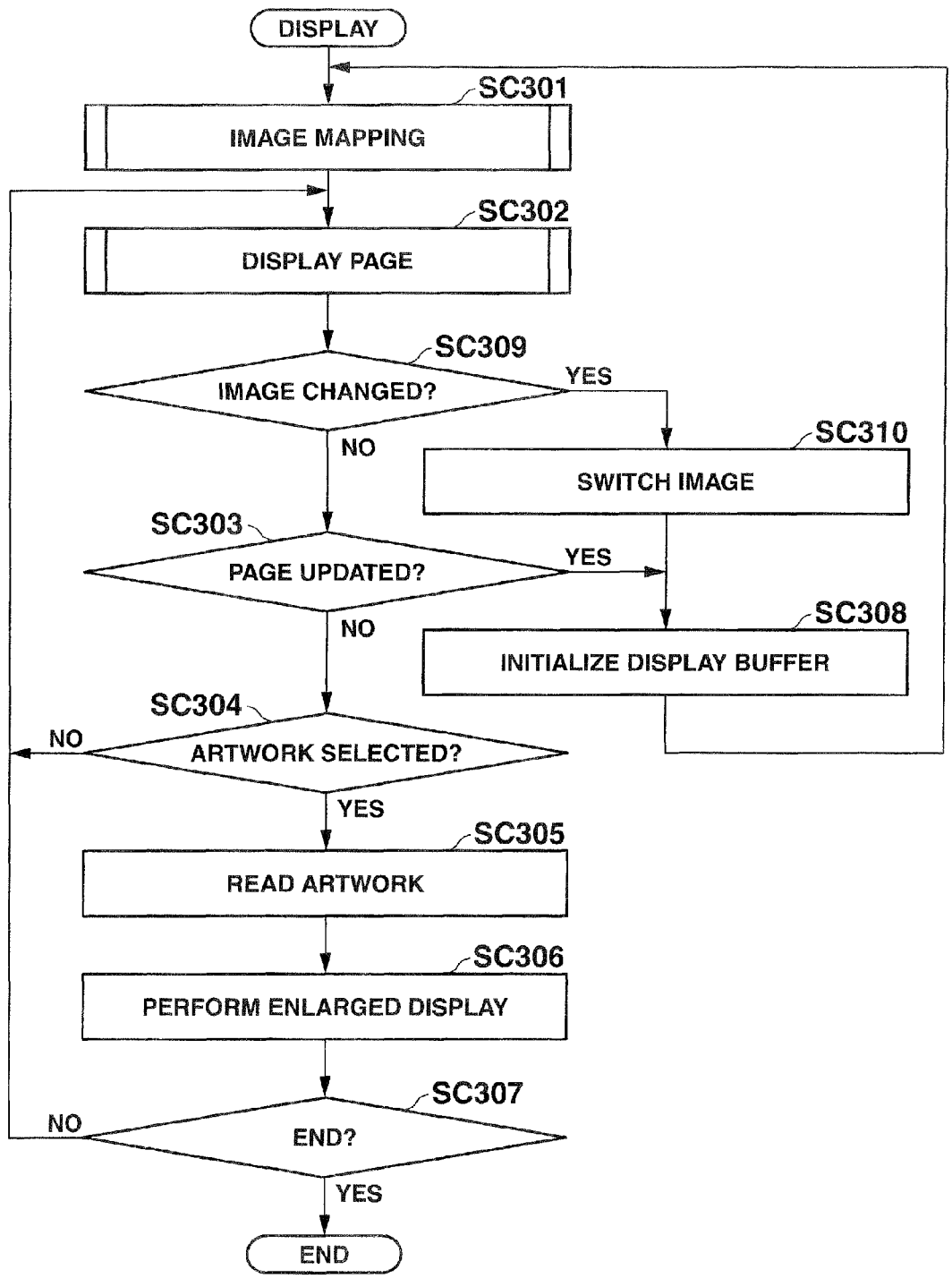
FIG. 9 is a flowchart illustrating another example of the display processing.

FIG. 9 is a flowchart, which corresponds to FIG. 8, illustrating a modification of the screen display processing in this case. As illustrated in FIG. 9, in the case that the display target is limited to the artwork having the specific painting tone, when the user issues a painting tone change instruction while the artworks having arbitrary painting tones are randomly displayed (YES in step SC309), the CPU 20 switches the painting tones of the artworks of the display targets in the previously determined order (step SC310), and then the CPU 20 may initialize the display buffer 30 (step SC308) and perform the page display processing described above.

Second Embodiment

A second embodiment of the invention will be described below. In the second embodiment, when the server 11 displays the artworks (images), the artworks are displayed in units of pages in the state in FIG. 21 unlike the first embodiment.

In the second embodiment, a layout mode of the artworks in a display surface (hereinafter referred to as a page screen) G of each page is substantially identical to the layout mode of the artworks in the virtual space of the first embodiment. A square first layout region R1 located in the center of the display screen, a second layout region R2 that is located outside of the first layout region R1 with a given width, and a third layout region R3 that is located outside of the second layout region R2 with a given width are provided on the display screen, and each artwork is laid out in one of the layout regions according to the value of the artwork. In the second embodiment, only the first layout region R1 is explicitly shown on the page screen G. An operation of the server 11 of the second embodiment will be described below.

Figure 16:
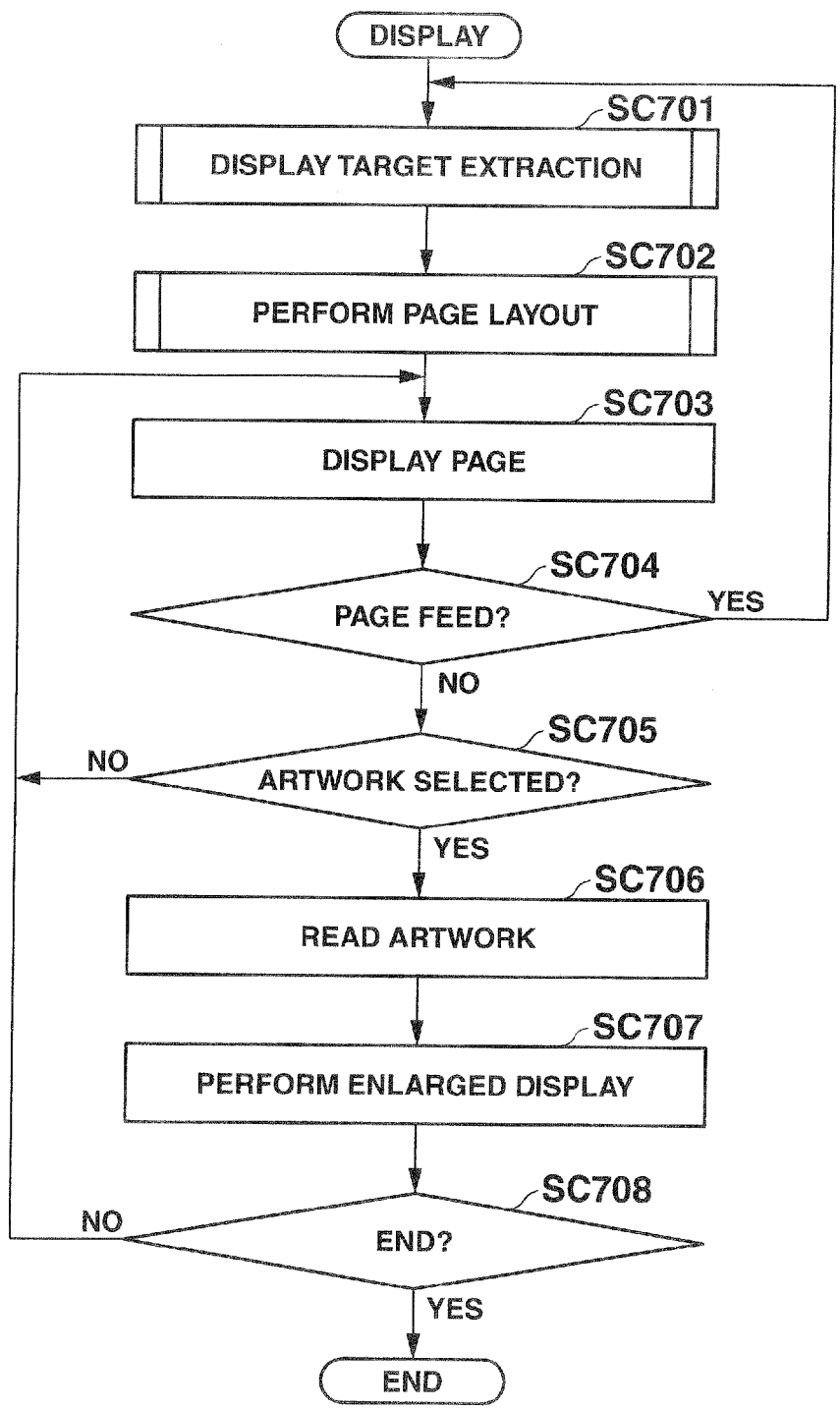
FIG. 16 is a flowchart illustrating screen display processing when a server displays many artwork in a second embodiment.

FIG. 16 is a flowchart illustrating screen display processing relating to the artwork display performed by the CPU 20 in the second embodiment. In the screen display processing, the CPU 20 performs display target extraction processing (step SC701) and page layout processing (step SC702), and performs the page display (step SC703), thereby displaying the page screen G in FIG. 21.

Figure 21:
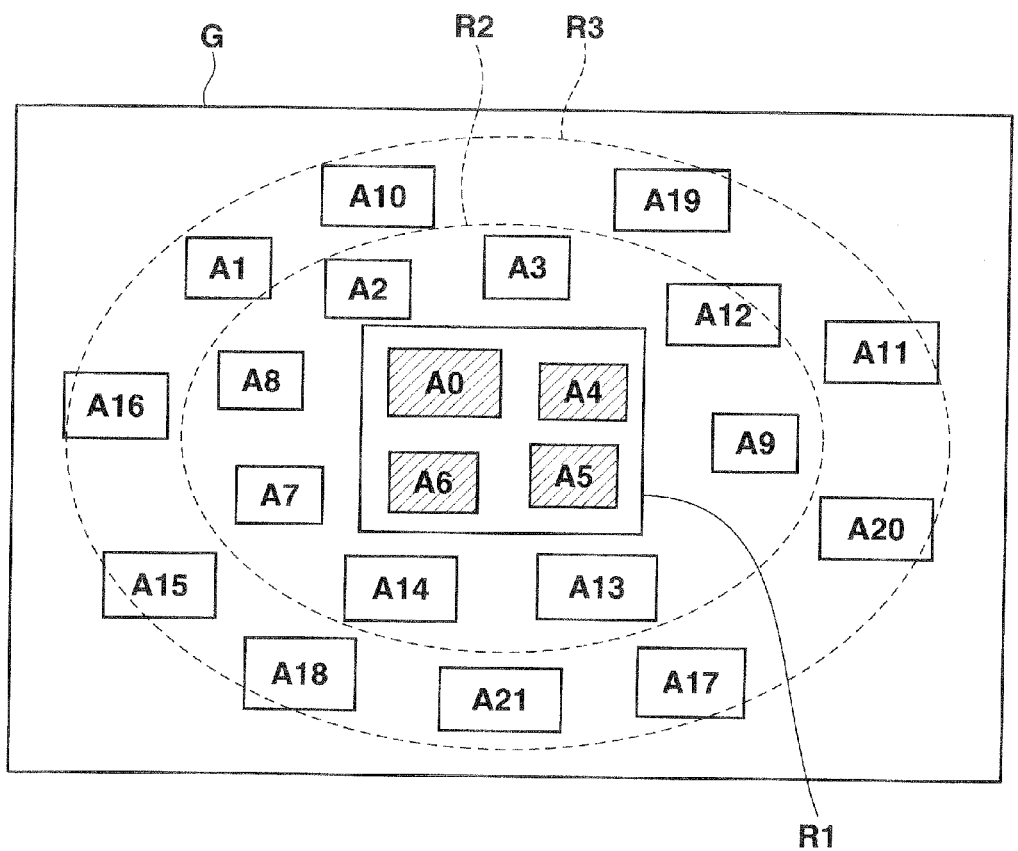
FIG. 21 is a view illustrating an example of a display screen when the server displays many artworks.

The items of processing in steps SC701 to SC703 are the artwork display processing (SC4) in FIG. 5, and the items of processing in steps SC701 to SC703 are the processing of displaying the artworks in FIG. 21 on the screen of the terminal 1-1 of a user who accesses the image service site 10.

Figure 18:
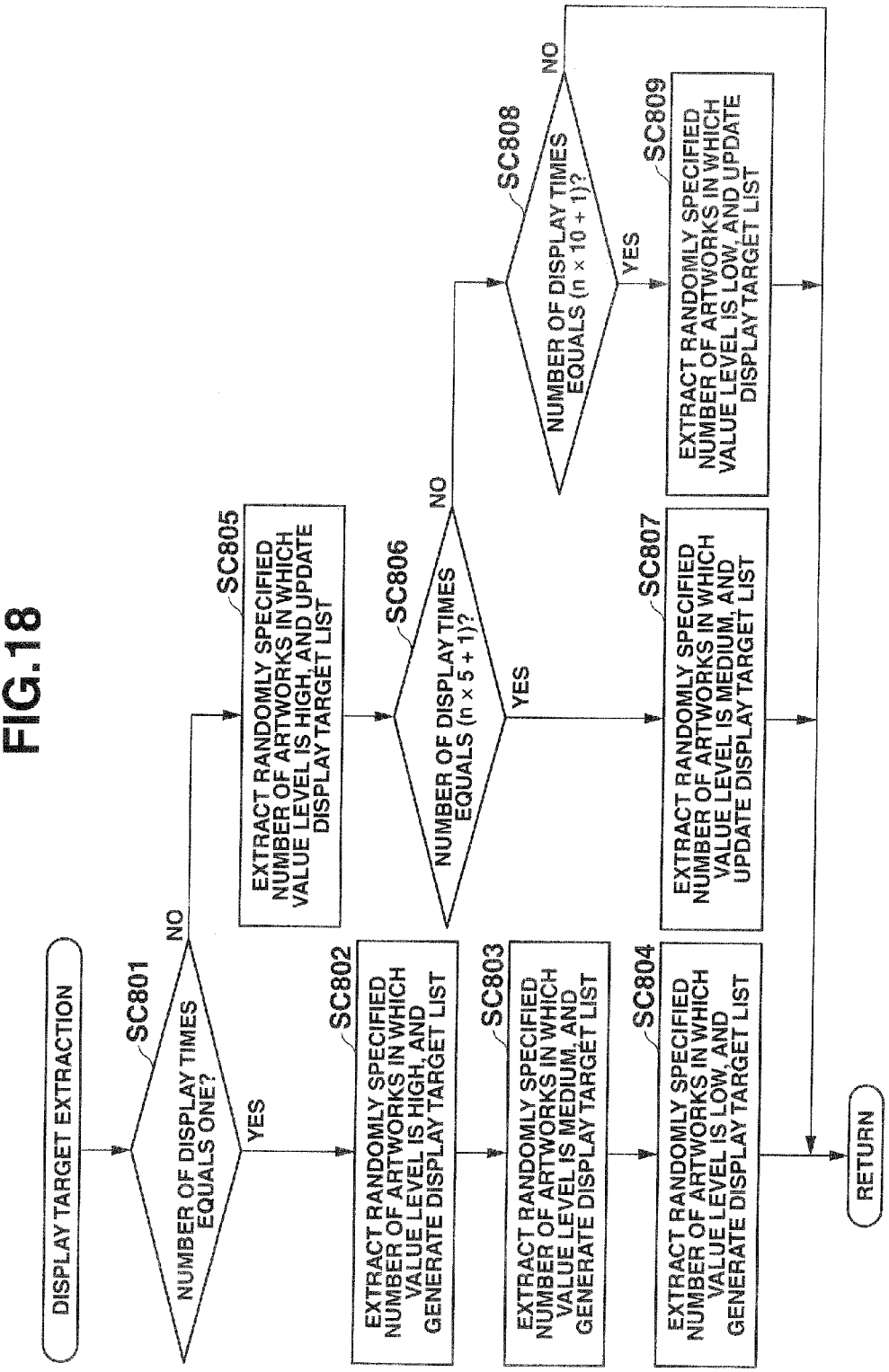
FIG. 18 is a flowchart illustrating display target extraction processing in the display processing.

The detailed content of the display target extraction processing in step SC701 will be described below with reference to a flowchart, in FIG. 18. The display target extraction processing is the processing of extracting a specific artwork group of the display target from artworks, which are posted on the server 11 and stored in the artwork memory 202.

In the display target extraction processing, the CPU 20 performs the following processing when the number of display times of the page screen is one (YES in step SC801).

The CPU 20 randomly extracts a specified number of artworks of the display targets only for the artworks in which the value level belongs to the high level in the artworks stored in the artwork memory 202, and the CPU 20 generates a display target artwork, in which the image IDs of the extracted artworks are stored, indicating only the display targets having the high value level (step SC802).

As with the first embodiment, the value level of the artwork in the second embodiment is classified by the number of steps equal to the number of layout regions. The value level of the artwork includes the high level, the medium level, and the low level. The specified number of artworks is previously determined number in which the artworks can be laid out in the first layout region R1 (FIG. 21).

Although not illustrated, the CPU 20 randomly extracts any artwork from the artworks stored in the artwork memory 202, and checks the value of the extracted artwork in step SC802. At this point, the value checking sequence is identical to that of the first embodiment. When the checked value of the artwork belongs to the high level, the CPU 20 determines the artwork as the display target and stores the image ID of the artwork. The processing is repeatedly performed until the image IDs are stored up to the specified number of artworks, thereby generating the display target list indicating only the display targets having the high value level.

Then, the CPU 20 randomly extracts a specified number of artworks of the display targets only for the artworks in which the value level belongs to the medium level in the artworks stored in the artwork memory 202, and the CPU 20 generates a display target list, in which the image IDs of the extracted artworks are stored, indicating only the display targets having the medium value level independently of the display target list indicating the display targets having the high value level (step SC803).

The CPU 20 randomly extracts a specified number of artworks of the display targets only for the artworks in which the value level belongs to the low level in the artworks stored in the artwork memory 202. The CPU 20 generates a display target list, in which the image IDs of the extracted artworks are stored, indicating only the display targets having the low value level independently of the display target list indicating the display targets having the high or medium value level (step SC804).

On the other hand, when the number of display times of the page screen is two or more (NO in step SC801), the following processing is performed.

The CPU 20 extracts a specified number of artworks that are newly set to the display targets only for the artworks in which the value level belongs to the high level in the artworks stored in the artwork memory 202, and the CPU 20 updates the display target list indicating on the display targets having the high value level (step SC805).

When the number of display times of the page screen is (n×5+1) (YES in step SC806), the CPU 20 extracts a specified number of artworks that are newly set to the display targets only for the artworks in which the value level belongs to the medium level in the artworks stored in the artwork memory 202, and the CPU 20 updates the display target list indicating only the display targets having the medium value level (step SC807).

When the number of display times of the page screen is (n×10+1) (YES in step SC808), the CPU 20 extracts a specified number of artworks that are newly set to the display targets only for the artworks in which the value level belongs to the low level in the artworks stored in the artwork memory 202, and the CPU 20 updates the play target list indicating only the display targets having the low value level SC809).

That is, in the display target extraction processing in which the number of display times of the page screen is two or more, the CPU 20 updates the display target list indicating the only high level display target every time in the display target lists indicating the display targets having the high, medium, and low value levels, the CPU 20 updates the display target list indicating only the medium level display target once every five times, and the CPU 20 updates the display target list indicating only the low level display target once every ten times.

After separately generating or updating the display target lists indicating the high, medium, and low level display targets through the display target extraction processing, the CPU 20 returns to the processing in FIG. 16 to perform the page layout processing in step SC702.

Figure 19:
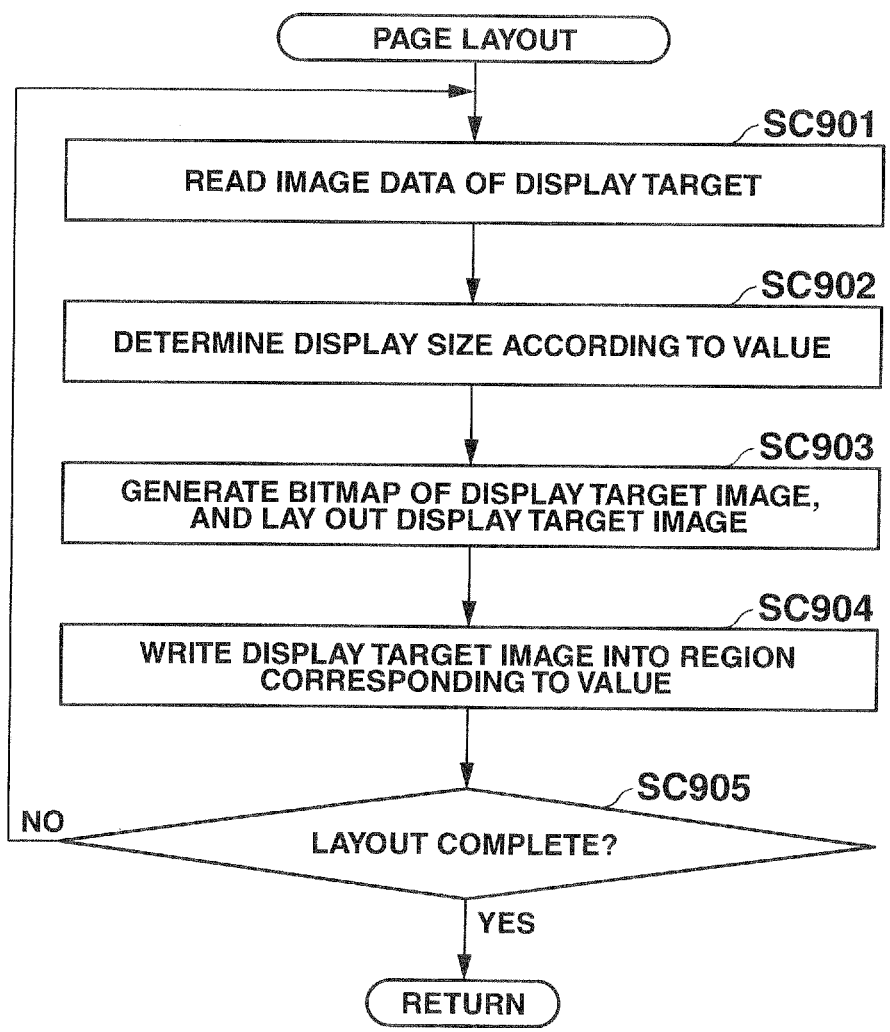
FIG. 19 is a flowchart illustrating page layout processing in the display processing.

FIG. 19 is a flowchart illustrating the content of the page layout processing. In the page layout processing, the CPU 20 sequentially reads the items of image data of the display targets indicated by the high, medium, and low level display target list generated or updated through the display target extraction processing (step SC901), and the CPU 20 determines the display size according to the value of the image data (artwork) (step SC902). The display size determining sequence is identical to that of the first embodiment.

The CPU 20 writes the items of image data read in step SC901 as bitmap data having the determined display size into the work memory (step SC903).

The CPU 20 writes the post-bitmap image data into the layout region corresponding to the value level of the image data in a display memory space of a display buffer 30 (step SC904). The layout region corresponding to the value level is identical to that of the first embodiment, the layout region of the image data having the high level is the first layout region R1, the layout region of the image data having the medium level is the second layout region R2, and the layout region of the image data having the low level is the third layout region P3.

Then CPU 20 repeatedly performs the items of processing in steps SC901 to SC904 until all the items of image data of the display targets indicated by the high, medium, and low level display target lists are written into the display memory space of the display buffer 30 (NO in step SC905). The CPU 20 returns to the processing in FIG. 16 at the time the layout is completed for all the items of image data of the display targets, the page screen G in FIG. 21 is displayed based on the items of image data laid out in the display memory space of the display buffer 30 (step SC703). That is, the randomly-extracted artwork group is displayed.

When the user issues a page feed instruction while the randomly-extracted artwork group is displayed (YES in step SC704), the CPU 20 returns to the processing in step SC701. After switching the artwork group of the display target by repeating the display target extraction processing and the page layout processing, the CPU 20 displays the artwork group that is newly becomes the display target (step SC703).

At this point, as described above, in the display target extraction processing in which the number of display times of the page screen is two or more, only the display target list indicating the display targets having the high value level is updated every time, the display target list indicating only the medium level display target is updated once every five times, and the CPU 20 updates the display target list indicating only the low level display target is updated once every ten times.

Figure 20A:
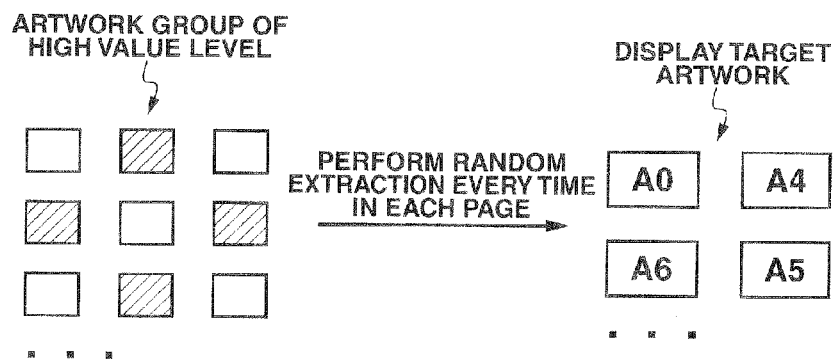
FIGS. 20A, 20B, and 20C are explanatory views illustrating a content of the display target extraction processing.
Figure 20B:
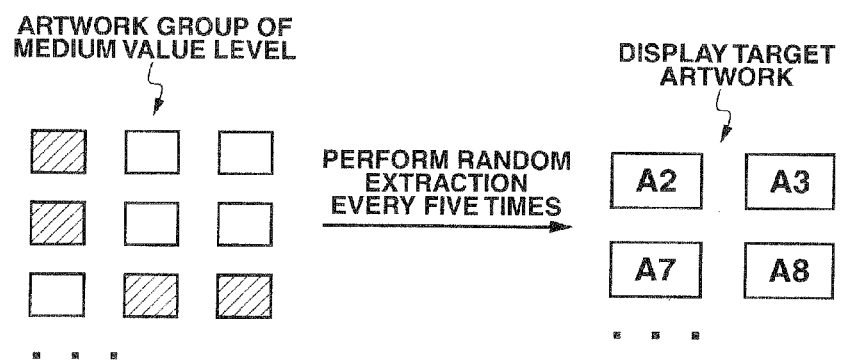
Figure 20C:
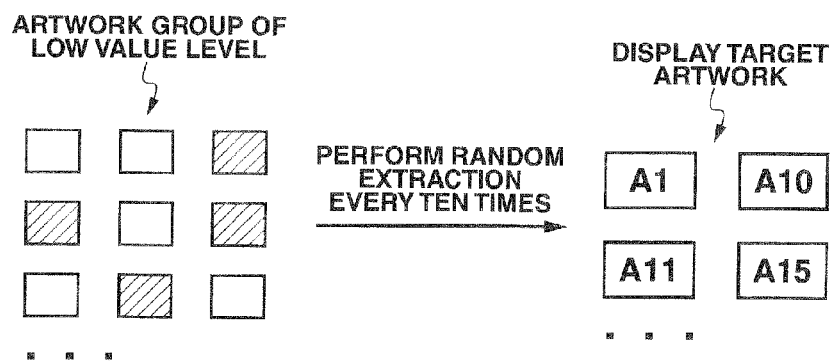

As illustrated in FIGS. 20A to 20C, while the user repeats the page feed plural times, the new display target in the artwork having the high value level is randomly extracted every time, the new display target in the artwork having the medium value level is randomly extracted once every five times, and the new display target in the artwork having the low value level is randomly extracted once every ten times.

As a result, while the user repeats the page feed plural times, only the artwork group displayed in the first layout region R1 is updated every time, the artwork group displayed in the second layout region R2 is updated only once every five times, and the artwork group displayed in the third layout region R3 is updated only once every ten times.

Because the items of processing from step SC705 are identical to the items of processing from step SC304 in FIG. 8 of the first embodiment, the description is omitted.

As described above, in the second embodiment, like the first embodiment, the artworks (images) stored in the server 11 are displayed while the artworks are randomly changed, and the probability of displaying the artworks is increased with increasing value of the artwork. Therefore, the image stored in the server through the network can efficiently be displayed such that the interest of the user is awakened.

In the second embodiment, the value of the artwork is increased with increasing point value of the artwork, the value of the artwork produced by the author of the normal pay member is set higher than the value of the artwork produced by the author of the free member, and the value of the artwork produced by the author of the premium member is set higher than the value of the artwork produced by the author of the normal pay member. Accordingly, the artworks having the higher point values are preferentially displayed with the higher probability rather than the artworks having the relatively lower point values, the artworks produced by the author of the normal pay member are preferentially displayed with the higher probability rather than the artworks produced by the author of the free member, and the artworks produced by the author of the premium member are preferentially displayed with the higher probability rather than the artworks produced by the author of the normal pay member.

In the second embodiment, the randomly-displayed artwork group is updated when the user issues the page feed instruction. Alternatively, for example, the artwork group may automatically be displayed at constant time intervals.

In the second embodiment, the value of each artwork may be determined by one of items of attribute information on the point value, the number of access times (browsing times), and the number of downloaded times of the artwork, plural items of attribute information, or only the membership type of the author of the artwork. The value of each artwork may be determined by the membership type of the author of the artwork and one of items of attribute information except the number of downloaded times. The value of each artwork may be determined by the membership type of the author of the artwork and plural items of attribute information.

In the second embodiment, during the screen display processing, the CPU 20 sets all the artworks, which are posted on the server 11 and stored in the artwork memory 202, to the display target. Alternatively, the artwork set to the display target may be limited to the artwork having a specific painting tone.

Figure 17:
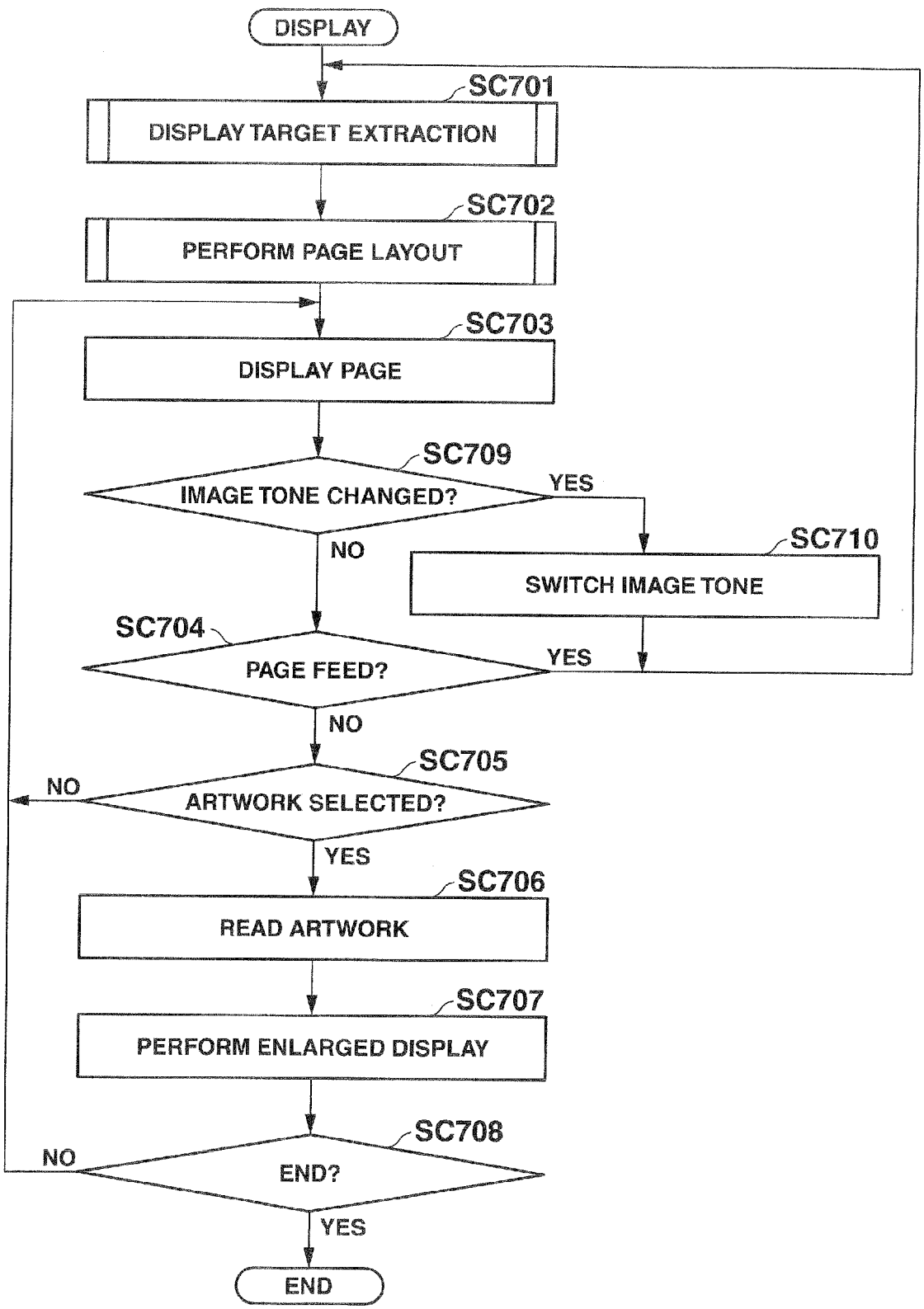
FIG. 17 is a flowchart illustrating another example of the display processing.

FIG. 17 is a flowchart, which corresponds to FIG. 16, illustrating modification of the screen display processing in this case. As illustrated in FIG. 17, in the case that the display target is limited to the artwork having the specific painting tone, when the user issues the painting tone change instruction while the artworks having arbitrary painting tones are randomly displayed (YES in step SC709), the CPU 20 switches the painting tones of the artworks of the display targets in the previously determined order (step SC710), and then the CPU 20 may perform the page display processing.

Other Embodiments

In the first and second embodiments, the invention is applied to the image posting site having the SNS function. In implementing the invention, it is not always necessary to have the SNS function. The image that becomes the display target is not limited to the image posted by the user, but any previously stored image may be used as the display target.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable medium in which a program for allowing the computer to function as predetermined means, allowing the computer to realize a predetermined function, or allowing the computer to conduct predetermined means.

What is claimed is:

1. An image display method for selectively displaying on a screen a plurality of images stored in a storage, the method comprising:
   causing a computer to set value information for the images stored in the storage as attribute information;
   causing the computer to determine display sizes based on the set value information such that a display size for an image of high value is larger than a display size for an image of low value;
   causing the computer to lay out the images in a virtual space divided into layout regions R1, R2, R3 in accordance with the value information and based on the determined display sizes, wherein the layout regions have respective degrees of importance, and wherein a degree of importance of layout region R1 is greater than a degree of importance of layout region R2, which is greater than a degree of importance of layout region R3;
   causing the computer to set a display region ZZ in the virtual space; and
   causing the computer to randomly move the display region ZZ in the virtual space and display the display region on the screen, wherein possibilities $P_{R1}$, $P_{R2}$ and $P_{R3}$ of the display region ZZ moving to layout regions R1, R2 and R3, respectively, satisfy $P_{R1} > P_{R2} > P_{R3}$.

2. The image display method according to claim 1, wherein causing the computer to randomly move the display region ZZ comprises maintaining the display region ZZ at a display state for a given time and then moving the display region ZZ.

3. The image display method according to claim 2, wherein layout region R1 is ellipsoidal, and
   wherein the display region ZZ moves to layout region R1 in a range defined by:

$-R1(a)/2 \le \alpha \le R1(a)/2$, $-R1(b)/2 \le \beta \le R1(b)/2$ where α is a random number representing an x-axis distance in the virtual space, β is a random number representing a y-axis distance in the virtual space, $R1(a)$ is a long-axis length of layout region R1 (or an outer diameter in an x-axis direction), and $R1(b)$ is a short-axis length of layout region RI (or an outer diameter in a y-axis direction).

4. The image display method according to claim 2, wherein layout region R2 is ellipsoidal, and
   wherein the display region ZZ moves to layout region RI in a range defined by:

$-R2(a)/2 \le \alpha \le R2(a)/2$, $-R2(b)/2 \le \beta \le R2(b)/2$ where α is a random number representing an x-axis distance in the virtual space, β is a random number representing a y-axis distance in the virtual space, $R2(a)$ is a long-axis length of layout region R2 (or an outer diameter in an x-axis direction), and $R2(b)$ is a short-axis length of layout region R2 (or an outer diameter in a y-axis direction).

5. The image display method according to claim 2, wherein layout region R3 is ellipsoidal, and
   wherein the display region ZZ moves to layout region R3 in a range defined by:

$-R3(a)/2 \le \alpha \le R3(a)/2$, $-R3(b)/2 \le \beta \le R3(b)/2$ where α is a random number representing an x-axis distance in the virtual space, β is a random number representing a y-axis distance in the virtual space, $R3(a)$ is a long-axis length of layout region R3 (or an outer diameter in an x-axis direction), and $R3(b)$ is a short-axis length of layout region R3 (or an outer diameter in a y-axis direction).

6. The image display method according to claim 1, wherein layout regions R1, R2 and R3 are concentrically ellipsoidal.

7. An image display apparatus which selectively displays on a screen a plurality of images stored in a storage, the image display apparatus comprising a processor configured to:
   set value information for the images stored in the storage as attribute information;
   determine display sizes based on the set value information such that a display size for an image of high value is larger than a display size for an image of low value;
   lay out the images in a virtual space divided into layout regions R1, R2, R3 in accordance with the value information and based on the determined display sizes, wherein the layout regions have respective degrees of importance, and wherein a degree of importance of layout region R1 is greater than a degree of importance of layout region R2, which is greater than a degree of importance of layout region R3;
   set a display region ZZ in the virtual space; and
   randomly move the display region ZZ in the virtual space and display the display region on the screen, wherein possibilities $P_{R1}$, $P_{R2}$ and $P_{R3}$ of the display region ZZ moving to layout regions R1, R2 and R3, respectively, satisfy $P_{R1} > P_{R2} > P_{R3}$.

8. A non-transitory computer-readable medium having a program stored thereon which causes a computer of an image display apparatus, which selectively displays on a screen a plurality of images stored in a storage, to perform functions comprising:
   setting value information for the images stored in the storage as attribute information;
   determining display sizes based on the set value information such that a display size for an image of high value is larger than a display size for an image of low value;
   laying out the images in a virtual space divided into layout regions R1, R2, R3 in accordance with the value information and based on the determined display sizes, wherein the layout regions have respective degrees of importance, and wherein a degree of importance of layout region R1 is greater than a degree of importance of layout region R2, which is greater than a degree of importance of layout region R3;
   setting a display region ZZ in the virtual space; and
   randomly moving the display region ZZ in the virtual space and display the display region on the screen, wherein possibilities $P_{R1}$, $P_{R2}$ and $P_{R3}$ of the display region ZZ moving to layout regions R1, R2 and R3, respectively, satisfy $P_{R1} > P_{R2} > P_{R3}$.

* * * * *

UNITED STATES PATENT AND TRADEMARK OFFICE
CERTIFICATE OF CORRECTION

PATENT NO. : 9,098,534 B2  
APPLICATION NO. : 13/555464  
DATED : August 4, 2015  
INVENTOR(S) : Yoshiharu Houjou Page 1 of 1

It is certified that error appears in the above-identified patent and that said Letters Patent is hereby corrected as shown below:

In the claims

Column 19, line 47, claim 3, delete "RI" and insert --R1--.

Column 19, line 51, claim 4, delete "RI" and insert --R1--.

Signed and Sealed this  
First Day of March, 2016

Michelle K. Lee  
*Director of the United States Patent and Trademark Office*